United States Patent
Manchester et al.

(10) Patent No.: US 6,574,333 B1
(45) Date of Patent: Jun. 3, 2003

(54) STATE MACHINE BASED UNIVERSAL VOICE GRADE CARDS

(75) Inventors: E. Barton Manchester, Rohnert Park, CA (US); Bradley N. Yearwood, Cotati, CA (US)

(73) Assignee: Next Level Communications, Inc., Rohnert Park, CA (US)

( * ) Notice: Subject to any disclaimer, the term of this patent is extended or adjusted under 35 U.S.C. 154(b) by 0 days.

(21) Appl. No.: 09/442,870

(22) Filed: Nov. 18, 1999

Related U.S. Application Data

(62) Division of application No. 08/795,184, filed on Feb. 4, 1997.

(51) Int. Cl.[7] ............................. H04M 3/00; H04M 1/00
(52) U.S. Cl. .............. 379/377; 379/26.02; 379/399.01; 379/379; 379/412
(58) Field of Search .................. 379/377, 379, 379/382, 383, 384, 380, 398, 399.01, 413, 412, 413.02, 414, 26.02; 370/356, 398, 422, 489, 321, 326, 337, 395, 397, 399, 401, 404, 409, 396, 425, 442, 352

(56) References Cited

U.S. PATENT DOCUMENTS

| | | |
|---|---|---|
| 3,482,030 A | 12/1969 | Wisniewski |
| 3,879,580 A | 4/1975 | Schlosser et al. |
| 4,135,202 A | 1/1979 | Cutler |

(List continued on next page.)

FOREIGN PATENT DOCUMENTS

| | | |
|---|---|---|
| DE | 29 38 982 A1 | 4/1981 |
| EP | 051 494 A1 | 5/1982 |
| EP | 281 147 A1 | 9/1988 |
| EP | 0 468 818 A2 | 1/1992 |
| WO | WO 95/22221 | 8/1995 |
| WO | WO 96/34485 | 10/1996 |
| WO | WO 97/03506 | 1/1997 |

OTHER PUBLICATIONS

Advanced Micro Devices AM79C02/03/031(A) Dual Subscriber Line Audio Processing Circuit ("DSLAC") Devices, Publication No. 09875, Rev. G, Dec. 1994, pp. 2–73 through 2–116.

Advanced Micro Devices AM7949 Subscriber Line Interface Circuit, Publication No. 18507 Rev. A, Dec. 1994, pp. 1–141 through 156.

Advanced Micro Devices publication entitled "SLIC Family Description", pp. 1–9 through 1–23.

AT&T Microelectronics Data Book, An Introduction to the ATTL/758X Series of Line Card Access Switches, pp. 4–57 through 4–94.

Massey, James L., "An Introduction to Contemporary Cryptology", *Proceedings of IEEE*, vol. 76, No. 5, May 1988, pp. 533–549.

Federal Information Processing Standards Publication 186, Digital Signature Standard (DSS), May 19, 1994, pp. 1–20 plus 5 unnumbered pages.

Bellcore Specification TR–NWT–000303, Issue 2, Dec. 1993, pp. 12–1 to 12–250.

(List continued on next page.)

*Primary Examiner*—Rexford Barnie
(74) *Attorney, Agent, or Firm*—Covington & Burling

(57) ABSTRACT

A fiber to the curb communication system providing telephone service to subscribers using line cards which are pluggable into a broadband network unit. The line cards provide telephone service to up to six lines per card. The cards are programmable from a central location, and the system includes self-testing of the cards, ring generator testing and provides for testing of the telephone lines from the system to the subscriber's location.

2 Claims, 28 Drawing Sheets

U.S. PATENT DOCUMENTS

| | | |
|---|---|---|
| 4,200,770 A | 4/1980 | Hellman et al. |
| 4,207,431 A | 6/1980 | McVoy |
| 4,218,582 A | 8/1980 | Hellman et al. |
| 4,367,548 A | 1/1983 | Cotten, Jr. et al. |
| 4,405,829 A | 9/1983 | Rivest et al. |
| 4,424,414 A | 1/1984 | Hellman et al. |
| 4,496,800 A | 1/1985 | Young |
| 4,530,008 A | 7/1985 | McVoy |
| 4,542,437 A | 9/1985 | Ellis et al. |
| 4,553,161 A | 11/1985 | Citta |
| 4,606,023 A | 8/1986 | Dragoo |
| 4,745,468 A | 5/1988 | Von Kohorn |
| 4,763,191 A | 8/1988 | Gordon et al. |
| 4,813,012 A | 3/1989 | Valeri et al. |
| 4,876,592 A | 10/1989 | Von Kohorn |
| 4,910,586 A | 3/1990 | Sharpe et al. |
| 4,926,255 A | 5/1990 | Von Kohorn |
| 4,993,019 A | 2/1991 | Cole et al. |
| 4,995,082 A | 2/1991 | Schnorr |
| 4,998,274 A | 3/1991 | Ephraim |
| 5,034,807 A | 7/1991 | Von Kohorn |
| 5,057,915 A | 10/1991 | Von Kohorn |
| 5,063,595 A | 11/1991 | Ballance |
| 5,128,752 A | 7/1992 | Von Kohorn |
| 5,150,247 A | 9/1992 | Sharpe et al. |
| 5,227,874 A | 7/1993 | Von Kohorn |
| 5,231,668 A | 7/1993 | Kravitz |
| 5,249,044 A | 9/1993 | Von Kohorn |
| 5,272,664 A | 12/1993 | Alexander et al. |
| 5,305,312 A | 4/1994 | Fornek et al. |
| 5,349,341 A | 9/1994 | Hauschild |
| 5,349,457 A | 9/1994 | Bears |
| 5,387,927 A | 2/1995 | Look et al. |
| 5,418,625 A | 5/1995 | Shimoosawa |
| 5,444,710 A | 8/1995 | Fisher et al. |
| 5,457,560 A | 10/1995 | Sharpe et al. |
| 5,499,241 A | 3/1996 | Thompson et al. |
| 5,572,347 A | 11/1996 | Burton et al. |
| 5,576,874 A | 11/1996 | Czerwiec et al. |
| 5,600,469 A | 2/1997 | Yamazaki |
| 5,680,394 A | 10/1997 | Bingham et al. |
| 5,729,370 A | 3/1998 | Bernstein et al. |
| 5,761,273 A | 6/1998 | Sanders |
| 5,781,320 A | 7/1998 | Byers |
| 5,935,209 A * | 8/1999 | Budhraja et al. ............ 709/223 |
| 6,081,519 A * | 6/2000 | Petler .......................... 370/356 |

OTHER PUBLICATIONS

Bellcore Specification TR–NWT–000057, Issue 2, Jan. 1993, pp. 4–11 to 4–14.

Bellcor Specification TR–TSY–000008, Issue 2, Aug. 1987, pp. 1–1 to 1–11, 2–1, 3–1 to 3–15, 4–1 to 4–19, 5–1 to 5–11, 6–1 to 6–7, 7–1 to 7–10, 8–1 to 8–2, 9–1 to 9–2, A1 to A11, B1 to B2, C1 to C5.

Bellcore Specification TA–NWT–000909, Issue 2, Dec. 1993, pp. 3–1 to 3–12, 4–1 to 4–38, 5–1 to 5–8.

Nelson, George A., et al., "SPOTS Channel Units: Two–for–One Advantage in Analog Special Service Circuits", *Bell Labs Record* (Jan. 1985), 1 unnumbered page.

Reeve, Witham D., "Subscriber Loop Signaling and Transmission Handbook" (IEEE Press, Piscataway, New Jersey, 1992), pp. 21–43.

Larose, Mario, et al., "DMS–1 Urban: a new generation of digital loop carrier", *Telesis* (1986), vol. 13, No. 2, pp. 13–21.

Fraser, Jim, et al., "DMS–1 Urban: flexible architecture", *Telesis* (1986), vol. 13, No. 2, pp. 23–30.

Harrington, George E., et al., "A Smart SLC Carrier Meets the Changing Nature of Services in the Evolving Digital Loop", *Bell Labs Record* (Sep. 1985), pp. 13–17.

Federal Information Processing Standards Publication 180–1, "Secure Hash Standard", Apr. 17, 1995, pp. 1–21.

Dail, James, et al., "Adaptive Digital Access Protocol: A MAC Protocol for Multiservice Broadband Access Networks", IEEE Communications Magazine, vol. 34 (1996) Mar., No. 3, pp. 104–112.

* cited by examiner

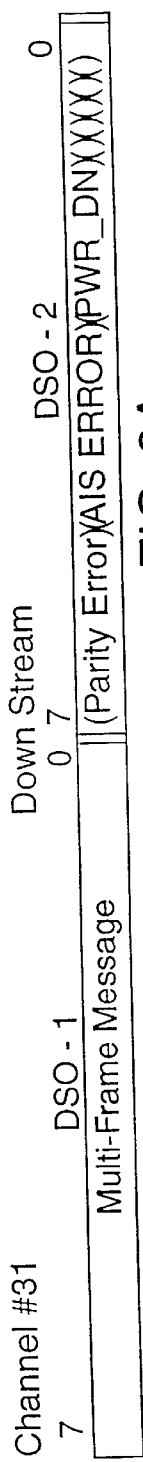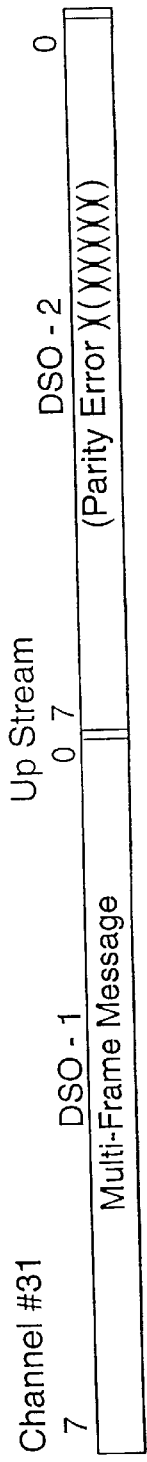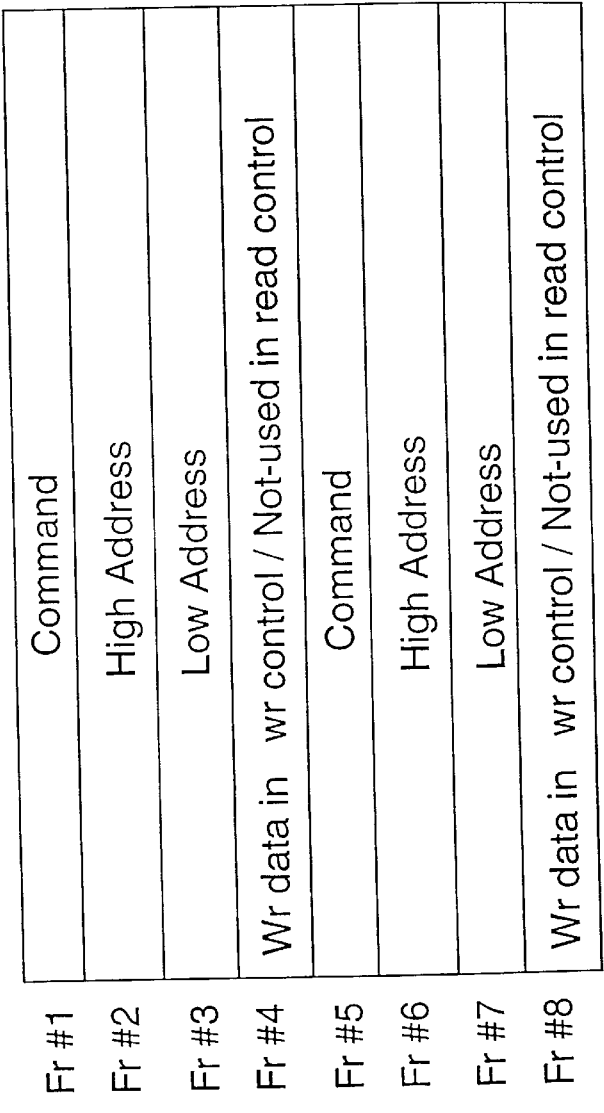
FIG. 9A
FIG. 9B
FIG. 9C BNCC→TIU CTL#1 MESSAGE

| MESSAGE DESCRIPTION | COMMAND | ADDRESS | DATA |
|---|---|---|---|
| RESET WHOLE POTS CARD | $69 | $5AB3 | $96 |
| START | $04 | STARTING ADDRESS | DON'T CARE |
| SET UPSTREAM BIT OFFSET | $03 | LEAST SIGNIFICANT NINE BITS OF 16 BIT ADDRESS ARE THE OFFSET. | DON'T CARE |
| UNLOCK | $55 | $1234 | $77 |
| TEST LOOPBACK | $22 | 16 BIT NUMBER | DON'T CARE |
| READ | $01 | ADDRESS | DON'T CARE |
| WRITE | $02 | ADDRESS | DATA |
| NO OPERATION | $00 | DON'T CARE | DON'T CARE |

*NOTE: UPSTREAM REPLIES USE DOWNSTREAM COMMAND NUMBER WITH $80 ADDED TO IT AS THE UPSTREAM COMMAND NUMBER.

FIG. 9D

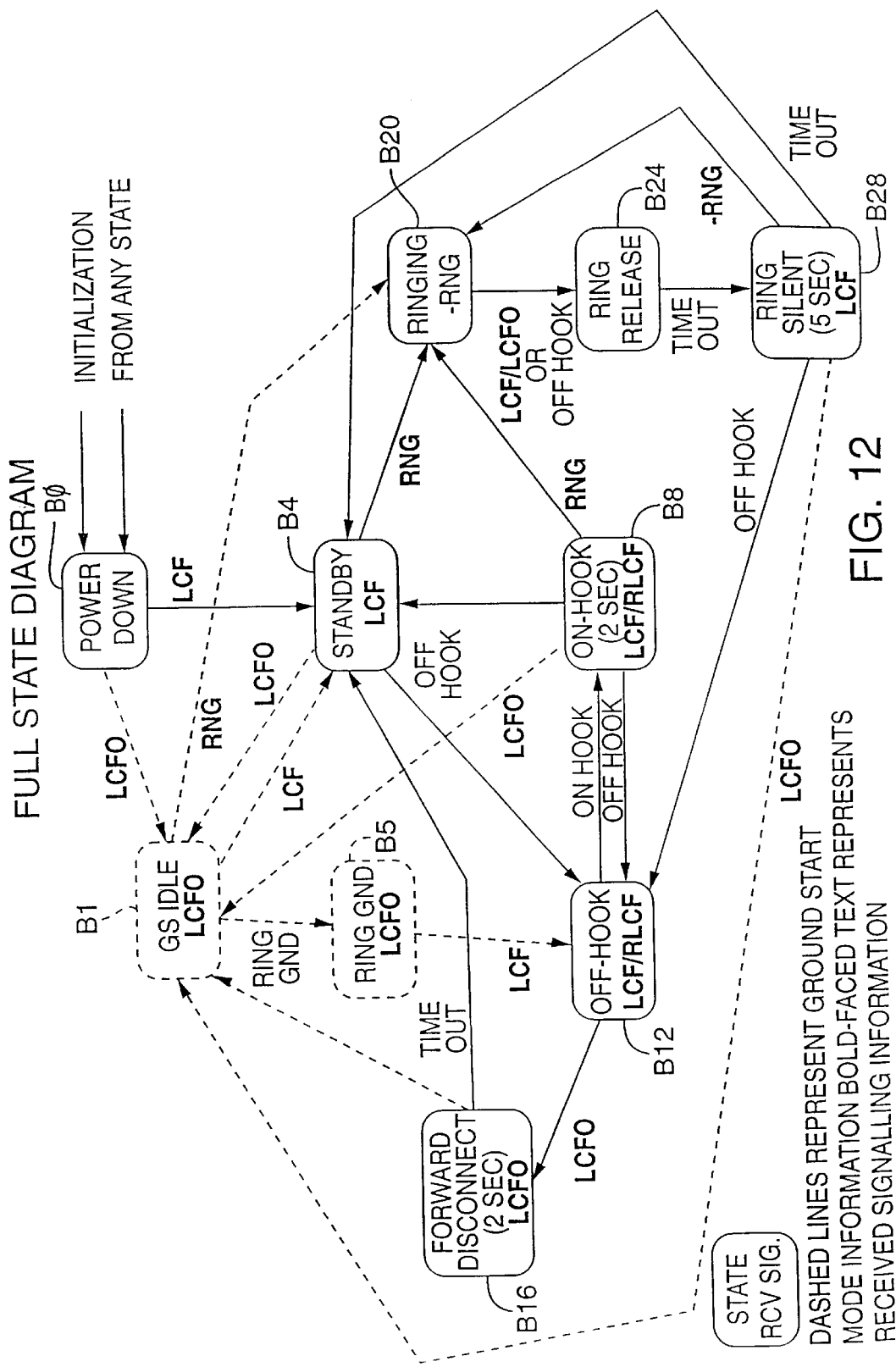

FIG. 15

| | C | B | A | |
|---|---|---|---|---|
| TipF — RingF — | C32 R6 | | A32 T6 | 32 |
| | | | | 31 |
| TipE — RingE — | C30 R5 | | A30 T5 | 30 |
| | | | | 29 |
| TipD — RingD — | C28 R4 | | A28 T4 | 28 |
| | | | | 27 |
| TipC — RingC — | C26 R3 | | A26 T3 | 26 |
| | | | | 25 |
| TipB — RingB — | C24 R2 | | A24 T2 | 24 |
| | | | | 23 |
| TipA — RingA — | C22 R1 | | A22 T1 | 22 |
| | | | | 21 |
| DropTip — DropRing — | C20 ToR | | A20 ToT | 20 |
| LineTip — LineRing — | C19 TiR | | A19 TiT | 19 |
| | | | | 18 |
| RGND\G — VRGEN — | C17 VRn | | A17 VRp | 17 |
| | FGnd | FGnd | FGnd | 16 |
| | Nc | Nc | Nc | 15 |
| | BGnd | BGnd | BGnd | 14 |
| Vbb2_Pre | B13 Vbb2 | Vbb2P | Vbb2 | 13 |
| Vbb1_Pre | B12 Vbb1 | Vbb1P | Nc | 12 |
| | Nc | Nc | Nc | 11 |
| Vee_Pre — Vee_In — | C10 Vee | B10 VeeP | A10 Vee | 10  Vee_In |
| | Gnd | Gnd | Gnd | 9 |
| Vaa_Pre — Vaa_In — | C8 Vaa | B8 VaaP | A8 Vaa | 8  Vaa_In |
| TCtl — TSp1 — | C7 Sp1 | B7 Ctl | Gnd | 7 |
| TSp2 — | C6 Sp2 | Gnd | Rst | A6  6  BpRst |
| TFs — TUpDat — | C5 UpD | B5 Fs | Gnd | 5 |
| TDnDat — | C4 DnD | Gnd | Clk | A4  4  TClk |
| | Vdd | B3 VddP | Vdd | 3 |
| | Gnd | B2 Ba | Gnd | 2 |
| VCC_PRE — Vcc_In — | C1 Vcc | B1 VccP | A1 Vcc | 1  66M  Vcc_In |

860
CONNECTOR
711D-03X32

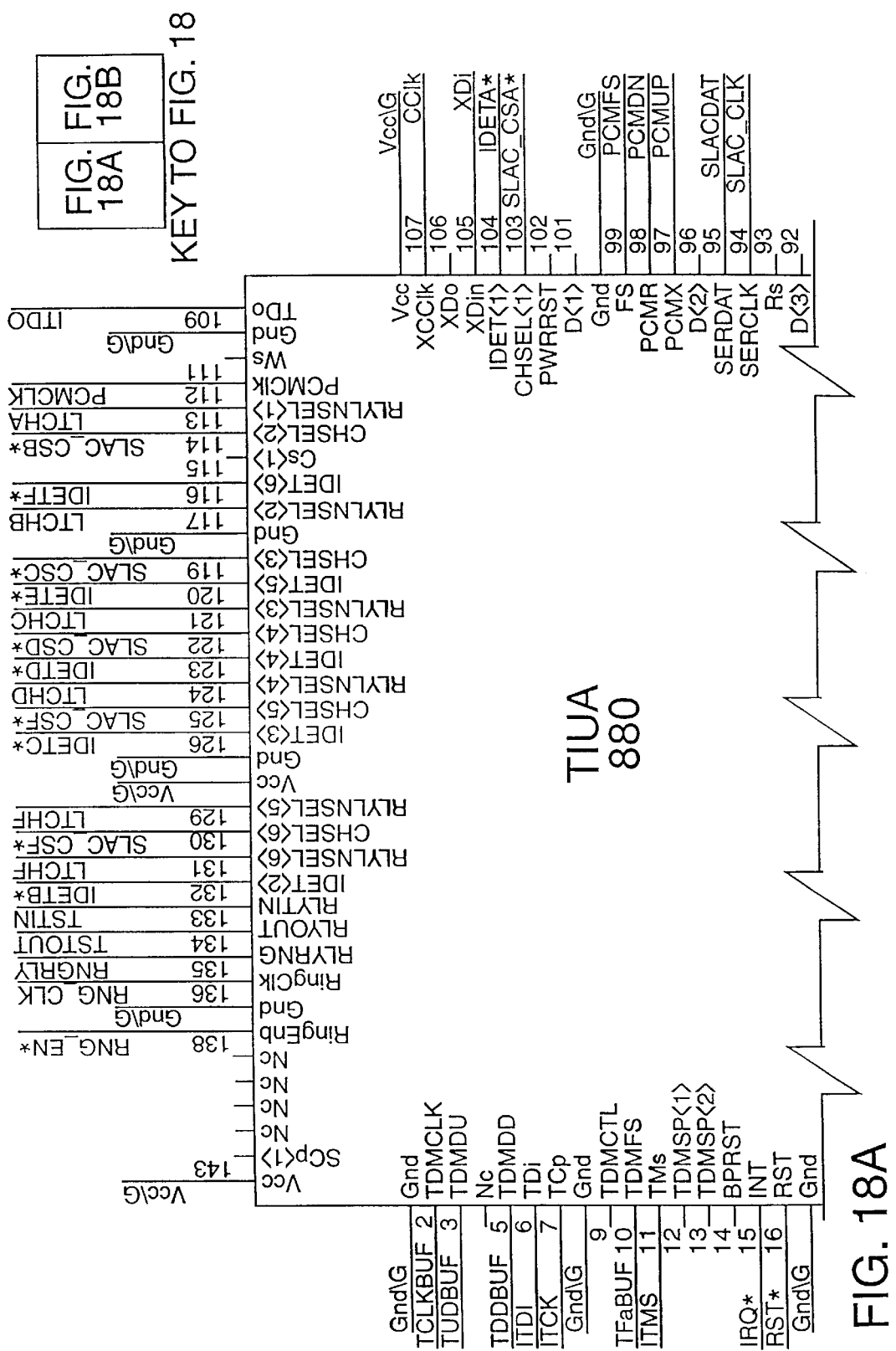

STATE MACHINE BASED UNIVERSAL VOICE GRADE CARDS

CROSS-REFERENCE TO RELATED APPLICATION

This application is a division of U.S. patent application Ser. No. 08/795,184, filed Feb. 4, 1997 entitled "Method and Apparatus for Reliable Operation of Universal Voice Grade Cards", now allowed.

CROSS REFERENCE TO MICROFICHE APPENDIX

The microfiche appendix, which is a part of the present disclosure, contains two sheets of microfiche having one hundred and fifty frames and is a netlist of the telephone interface unit ASIC (TIUA) used in connection with an embodiment of the present invention. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights.

BACKGROUND OF THE INVENTION

Fiber-to-the-curb (FTTC) systems can provide both traditional telecommunications services such as Plain Old Telephony service (POTS) as well as advanced services such as Switched Digital Video (SDV) and high speed data access. Because of the range of services which can be supported, it is likely that FTTC systems will be widely deployed by telephone companies as they install new lines and upgrade their networks.

Since POTS is the basic telephone service that is used by over 100 million subscribers in the US, it is essential that the service be reliable. FTTC equipment provides POTS service by the use of a printed circuit board containing electronics supporting one or more telephone lines, usually termed a universal voice grade (UVG) card. The UVG cards are located in a broadband network unit which is typically located in the neighborhood near a group of homes. In a widespread deployment of FTTC there will be millions of UVG cards for BNUs, and the telephone companies will maintain large inventories of these cards for installation and maintenance.

Faulty operation of a UVG card may take place due to the fact that the card has an electrical failure, or may occur due to an error in the software, including hardware programmable state machines, contained within the card. In addition, it is possible that a UVG card may be incompatible with a particular FTTC system due to design flaws or faulty manufacturing. Key aspects in the operation of the UVG card include the proper functioning of any application specific integrated circuits (ASICs) on the card, proper functioning of the state machine which controls the various states of the line including on-hook, off-hook, and ringing, as well as the ability to modify the state machine in the case of a programming error or system change, and the ability to properly test the communications channel formed by the circuit on the UVG card and the twisted air drop cable which connects the card to the residential telephone wiring.

For the foregoing reasons there exists the need for methods and apparatus to identify the type and source of UVG cards in the FTTC system, properly test the functioning of any ASICs on the UVG card, verify state machine software and download new versions of state machine software, and test the subscriber telephone line.

BRIEF DESCRIPTION OF THE DRAWINGS

FIG. 9A illustrates the format of a downstream channel for communication from the system broadband network unit to UVG cards;

FIG. 9B illustrates the format of an upstream channel for communication from UVG cards to the broadband network unit;

FIG. 9C shows a format for common control to UVG card control messages;

FIG. 9D illustrates commands used in the system;

FIG. 12 shows a full state diagram for a UVG card such as that illustrated in FIG. 3;

FIG. 15 illustrates the connectors utilized on UVG cards in the system;

SUMMARY OF THE INVENTION

Figure 1:
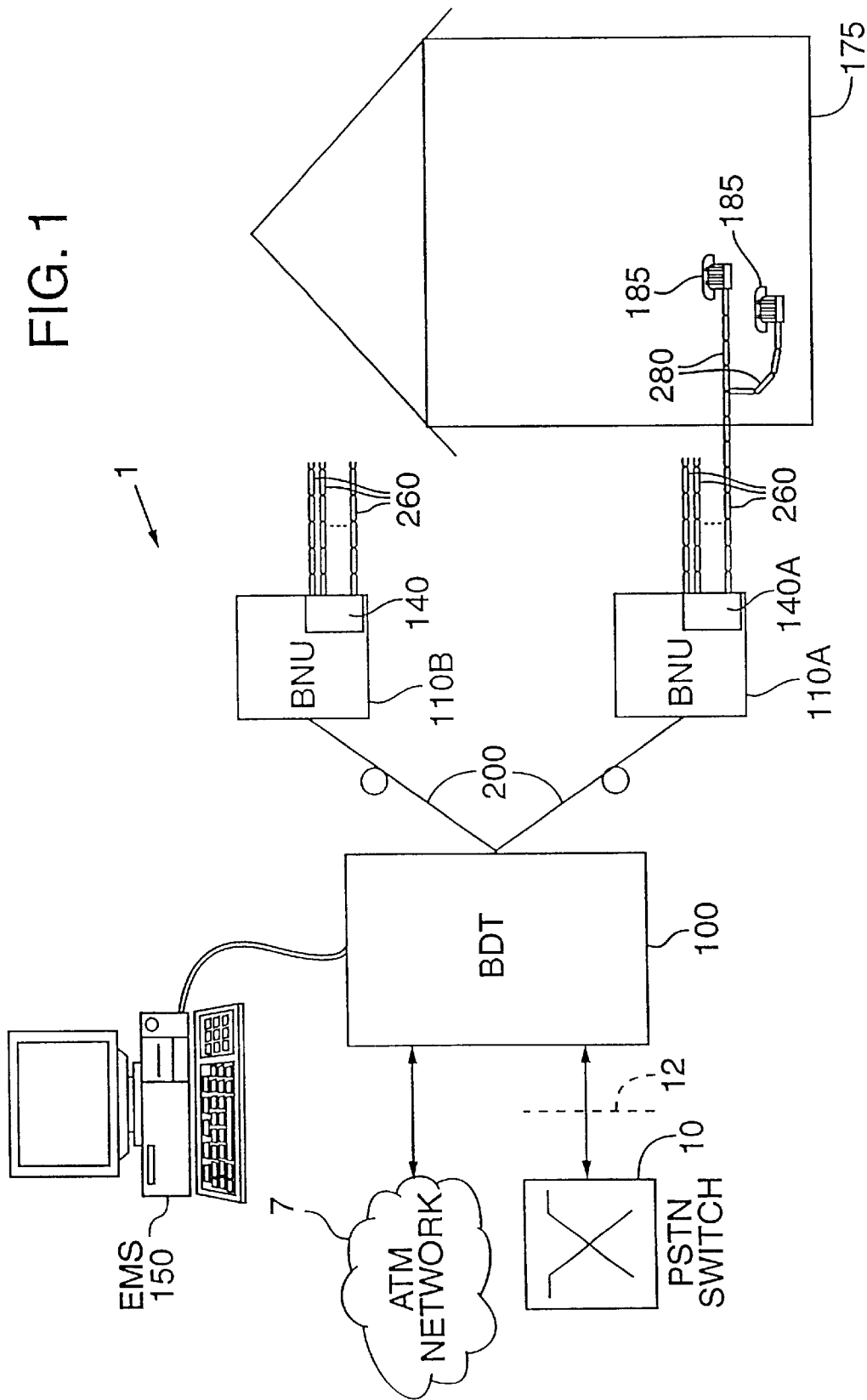
FIG. 1 shows a fiber-to-the-curb network.

In one embodiment of the present invention, a method is provided for communicating with a voice grade card in a fiber-to-the-curb telecommunications system. In the method, a frame synchronization signal is provided to the voice grade card, and a frame based downstream time division multiplexed signal which includes a frame overhead channel, thirty voice channels and a control channel, is also provided to the card. A frame based upstream time division multiplexed signal which includes a frame overhead channel, a plurality of voice channels and a control channel is transmitted from the card to the telecommunication system.

In another embodiment of the present invention, a voice grade card for providing telecommunications services in a fiber-to-the-curb telecommunication system is provided, the card having means for receiving a frame synchronization signal, means for receiving a frame based downstream time division multiplexed signal which includes a first frame overhead channel, thirty voice channels and control channel. The card also includes means for transmitting a frame based upstream time division multiplexed signal includes a frame overhead channel, thirty voice channels and a control channel.

Additionally, a circuit for testing the loop of a voice grade telecommunication circuit is provided, the circuit including at least one test relay connecting at least one test bus to a pair of resistors which are in parallel circuit configuration and connecting the relay to a twisted drop pair having a tip wire and a ring wire, and a drop test resistor placed in a shunt configuration between said tip wire and said ring wire.

And yet another embodiment of the present invention, a method for testing a ring generator circuit on a voice grade card in a telecommunications system is provided. The test method involves generating a first pulse train signal having a first duty cycle and applying this signal to the ring generator circuit, then measuring the DC voltage output of the ring generator circuit. Additionally a second pulse train signal having a second duty cycle is applied to the ring generator circuit and the DC voltage output of the ring generator circuit is measured. To determine whether the ring generator circuit is operating acceptably, the first and second DC voltages are compared to predetermined levels which are known to be acceptable.

In a further embodiment of the present invention, a ring generator test circuit is provided which includes a means for generating a first pulse train signal having a first duty cycle and a second pulse train signal having a second, different duty cycle and a means for applying the output of the pulse generating circuit to the ring generator and means for measuring an output voltage from the ring generator circuit resulting from the application of the first and second pulse train signals.

In another embodiment of the present invention a method in apparatus is provided for testing a ring generator in a voice grade card in a fiber-to-the-curb telecommunications system. In the method, a first digital pulse train signal is applied to the ring generator and the ringing frequency of the ring generator circuit measured. Thereafter, a second, different digital pulse train signal is applied to the ring generator and the ringing frequency from the ring generator circuit is measured. Finally, the method is completed by determining whether the first ringing frequency and the second ringing frequency are within acceptable operational limits. The circuit for testing a ring generator operating according to the above method includes a pulse train generating circuit for generating the first and second digital pulse train signals. Means are provided for applying the output of the pulse generating circuit to the ringer and means are provided for measuring the frequency of an output from the ring generator circuit in response to the application of first and second pulse train signals.

In yet another embodiment of the present invention, a method is provided for controlling the telephone line states in a fiber-to-the-curb telecommunications system having a voice grade card for providing voice telecommunication services. In this method, (i) the output state information is stored for the line states, (ii) a variable which represents a number of branches for the states is stored, (iii) branch condition information which includes signalling data, line status and timer information which indicate branching conditions is stored. Additionally, branch address information is stored and branch condition information is compared to determine if the branching conditions have been met. Finally the step of retrieving subsequent output data information and branch address information is performed when the branching conditions are met.

A method is provided for testing a voice grade card in a fiber-to-the-curb telecommunications system. In this method, a first seed value is provided to the card, the first seed value and a second seed value stored in the card are used to generate a data stream comprising bits. The generated bits are compared with a predetermined bit pattern to determine if the card is functioning properly.

A controllable voice grade card for a fiber-to-the-curb telecommunications system is provided, the card being controllable by four byte messages received in a control channel.

A method of communicating with a controllable voice grade card in a fiber-to-the-curb telecommunications system is provided, the method including receiving a first message with a downstream command code, and transmitting a reply message with an upstream reply code where the reply code is equal to the downstream command code plus a hexadecimal value.

In an embodiment of the present invention, a method of communicating a control message to a controllable voice grade card is provided, the method being performed by dividing the control message into a plurality of subportions; placing said message subportions into a plurality of frames of a frame based time division multiplexed signal; sending a plurality of frames of said frame based time division multiplexed signal to the card; and assembling the control message subportions to create a control message for controlling the voice grade card.

Further in accordance with the invention, a computer readable medium which comprises a plurality of state data structures used to define a state of telephone equipment is provided. The data structure for each state includes one or more branch data structures, each branch data structure defining a state transition that the telephone equipment is to take upon receiving an input. Each branch data structure includes data elements A and B, where A defines bit positions in which the input must have 1s for a state transition to take place, and B defines bit positions in which the input must have 0s for the state transition to take place. Finally the data structure includes a data element defining the address of the state data structure for the next telephone equipments state.

In a further embodiment in the present invention, a state machine is provided for a voice grade card used in a fiber-to-the-curb telecommunications system having a broadband network unit. The state machine includes a signalling preprocessing layer which includes a plurality of branches. The signally preprocessing layer receives signalling information from the broadband network unit and provides control information. The state machine further includes a main control layer having a plurality of branches, the main control layer receiving outputs from the signalling preprocessing layer and providing control of a plurality of branches in the main control layer to control the operations of telephone equipment connected to the voice grade card.

DESCRIPTION OF PREFERRED EMBODIMENTS

Table of Contents

I. Fiber-to-the-curb systems
  A. System overview
  B. Broadband Network Unit overview
  C. Universal Voice Grade card overview
II. Universal Voice Grade Card
  A. Universal Voice Grade initialization overview
  B. Universal Voice Grade card authentication
  C. Universal Voice Grade card test
    1. Ring generator test
    2. TIUA self-test
  D. State machine description, operation and downloading
  E. Two-layer State Machine
  F. Flexible State Machine
III. Universal Voice Grade card circuit and loop testing
I. Fiber-to-the-curb Systems
  A. System overview FIG. 1 illustrates FTTC system 1 which is comprised of broadband digital terminal (BDT) 100, which is connected by an optical fiber 200 to a broadband network units (BNU) 110A and 110B. The BNUs 110A and B each contain an optical receiver and transmitter to receive signals from and send signals to BDT 100, as well one or more UVG cards 140 which connect to residences 175 via twisted pair drop cable 60. In the residence 175 the in-home twisted pair cable connects the telephone 185 to the twisted pair drop able 260.

BDT 100 is connected to telecommunications networks via a public switched telecommunication network (PSTN) switch 10, and networks for advanced services such as the asynchronous transfer mode (ATM) network 7.

The FTTC system can be controlled through the use of an element management system (EMS) 150 which is software which runs on a workstation or computer which is connected to BDT 100. EMS 150 provides the ability to provision services or equipment which is effect the ability to modify the state of equipment in the system or provide new services. EMS 150 can typically be operated locally by an operator at the workstation or PC, or remotely via a connection through the PSTN switch 10 or the ATM network 7. EMS 150 also provides the ability to monitor and control the UVG cards 140 in the BNU 110.

Telecommunications systems are based on standards which have evolved over many years and insure compatibility of equipment from different manufacturers as well as providing clearly defined and precise specifications for different types of telecommunications services so that these services can be provided across geographic boundaries in a network with various generations of analog and digital telecommunications equipment. For FTTC systems the Bellcore specification TA-NWT-000909, entitled "Generic Requirements and Objectives for Fiber in the Loop Systems, Issue 2, December 1993, provides a comprehensive description of the requirements for FTTC systems as well as signaling and transmission requirements for UVG circuits, and is incorporated herein by reference in its entirety.

B. Broadband Network Unit Overview

Figure 2:
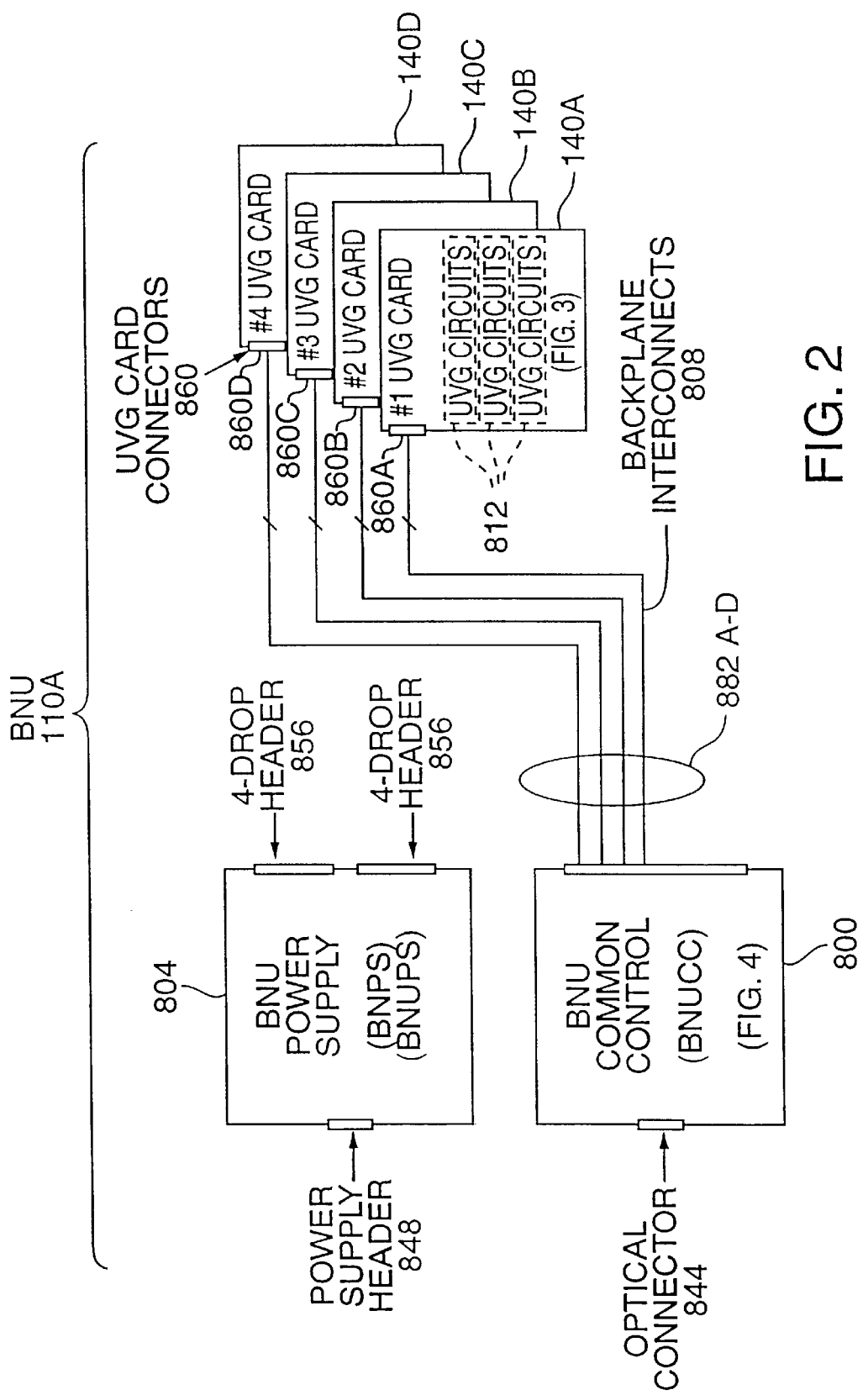
FIG. 2 shows a functional block diagram of the broadband network unit illustrated in FIG. 1.

A block diagram of the BNU 110A shown in FIG. 1 is illustrated in FIG. 2. The BNU 110A contains a broadband network unit power supply (BNUPS) 804 which receives a voltage from an external source at power supply header 848, and can power terminal equipment by connections made at a 4-drop header 856. BNU 110A further contains BNU Common Control (BNUCC) 800 which receives signals from optical fiber 200 at an optical connector 844. The BNUCC 800 contains the circuitry to send and receive optical signals, as well as a microprocessor and associated software to communicate with the BDT 100 and control the UVG cards 140.

Figure 3:
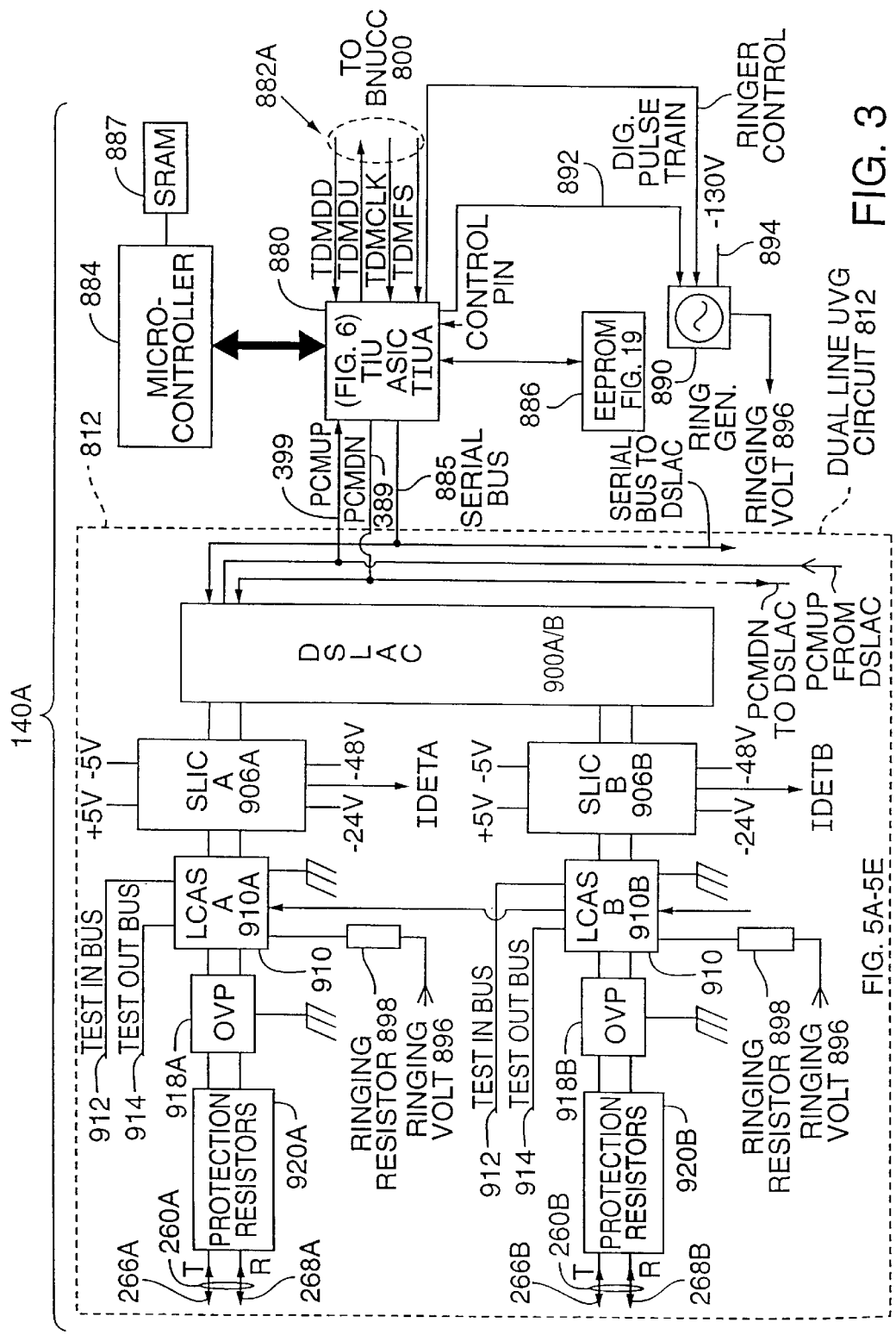
FIG. 3 shows a functional block diagram of a portion of a UVG card utilized in the broadband network unit of FIG. 1.

BNU 110A illustrated in FIG. 2 includes four UVG line cards indicated by reference characters 140A–140D. The transfer of information between BNUCC 800 and UVG cards 140A–140D are provided by a serial bus indicated in FIG. 2 as 882A–D. One bus communicating between BNUCC 800 and associated UVG card. Each UVG card includes three UVG circuits 812 as illustrated in FIG. 2. Each UVG circuit 812 provides POTS service to 2 lines. FIG. 3 illustrates in block diagram form the circuits for two of the POTS lines provided by UVG card 140A. A detailed electrical schematic of the circuitry for these two lines are illustrated in FIGS. 5A, 5B, 5C, 5D and 5E, which will be described below.

Each UVG card 140A–140D includes a connector 860A–860D respectively for providing POTS service to 6 lines. FIG. 15 illustrates in detail one connector 860, illustrating the signals for the respective pins on the connector. Additionally, the pin connections are also illustrated in Table 4 below.

Figure 4:
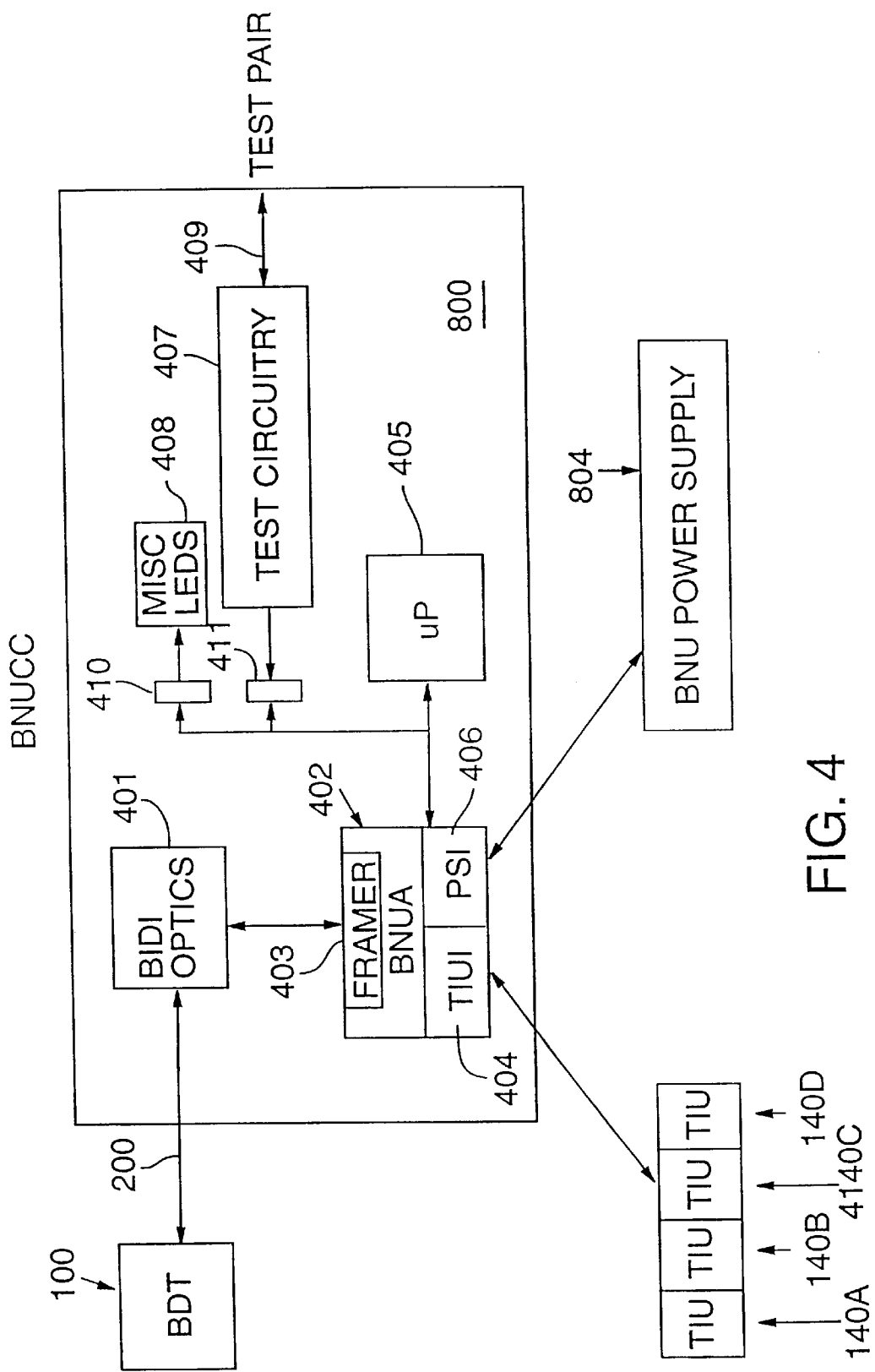
FIG. 4 shows a functional block diagram of the broadband network unit common control circuit.

Turning to FIG. 4, a functional block diagram is illustrated of the BNUCC 800 which is part of broadband network unit 110A. As will be appreciated from reference to FIGS. 2 and 4, BNUCC 800 provides the interface between the optical output from broadband digital terminal 100 and the UVG cards. As indicated above, the input to the UVG cards is in the time division multiplexed (TDM) signal format.

Referring to FIG. 4 which is a functional block diagram of BNUCC 800, BNUCC 800 includes circuitry to convert optical TDM signals to electrical TDM signals which are supplied to UVG cards 140A–140D. This starts with BDT 100 and the fiber connection via optical fiber 200, a single fiber connection carrying Synchronous Digital Hierarchy ("SDH") ATM data. This SDH-like data is intercepted in the BNUCC 800 by the bidirectional optics (BIDI) 401. BIDI 404 converts the optical signal received over fiber 200 into an electrical signal which is 155 megahertz (which is SDH-like ATM data). SDH-like ATM signals are provided to the BNUA 402. Initially, the first block that the SDH-like ATM signals are processed by is the SDH-like framer 403, which is scanning the incoming 155 megahertz signal for the framing information so that it can synchronize and determine where the data is and where the various components of the SDH-like frame format are. Once that occurs, the frames are delineated with respect to the location of the messaging bytes and all of the data. Framer 403 organizes the data both incoming and outgoing to the SDH-like stream, to provide communication to and from UVG cards 140–140D. The cross connect table in TIUI 404 also functions in the reverse direction to appropriately direct information which is going upstream (from the UVG cards to BIDI optics 401 to place data in the correct DS0 in the SDH-like frame. The TIUI interface unit 404 includes a cross connect table which is programmed by microprocessor 405 to direct the appropriate DS0s from the SDH-like stream to the UVG 140A–140D cards. This corresponds to the 4 megahertz interface as described in FIG. 8 and the frame format interface between BNUCC 800 and the UVG cards. Microprocessor 405 programs those cross connects from messages that it receives from the BDT100 over the same SDH-like link in a different section of the frame.

The power supply interface (PSI) 406 is coupled to the microprocessor 405 to monitor the power supply both as to how much power is being drawn and its status in controlling the LEDs and relays 410 and 411. This is a low speed interface which allows communication to occur between the BNUCC 800 and the power supply 804.

PSI 406 is also controlled by microprocessor 405. Also included in BNUCC 800 are miscellaneous LEDs 408 which are controlled by the microprocessor 405 or the BNUA 402.

Test circuitry 407 is connected to the back plane connector 860 (FIG. 15) test pair 409 to all of the UVG cards to allow single test circuitry to test any of the line cards lines. With six lines per UVG line card, and with four UVG line cards in a BNU, this allows a single set of test circuitry in the BNUCC800 to test any of those twenty-four twisted pairs via the test pair 409. Microcontroller 405 also controls that test circuitry.

C. Universal Voice Grade card overview

UVG cards 140A–D illustrated in FIGS. 1 and 2 provide POTS service to a number of residences, one of which is indicated by reference character 175, served by BNU 110, and can provide this service through a Loop Start or Ground Start line/trunk interface. Typically, 6 subscriber circuits (POTs lines) are served from each UVG card 140A–D. Referring to FIG. 2 the UVG card 140A contains three dual line UVG circuits 812 such as the one illustrated in FIG. 3. Although not shown, UVG cards 140B–D also include three UVG circuits 812.

The UVG card 140 also provides metallic test access toward the communications channel formed by the UVG circuit and toward the twisted pair drop cable 260. The functions of loop sense, ringing, and ring trip are provided, as are tip open condition, (ground start idle condition), and ring ground detection.

Figure 16:
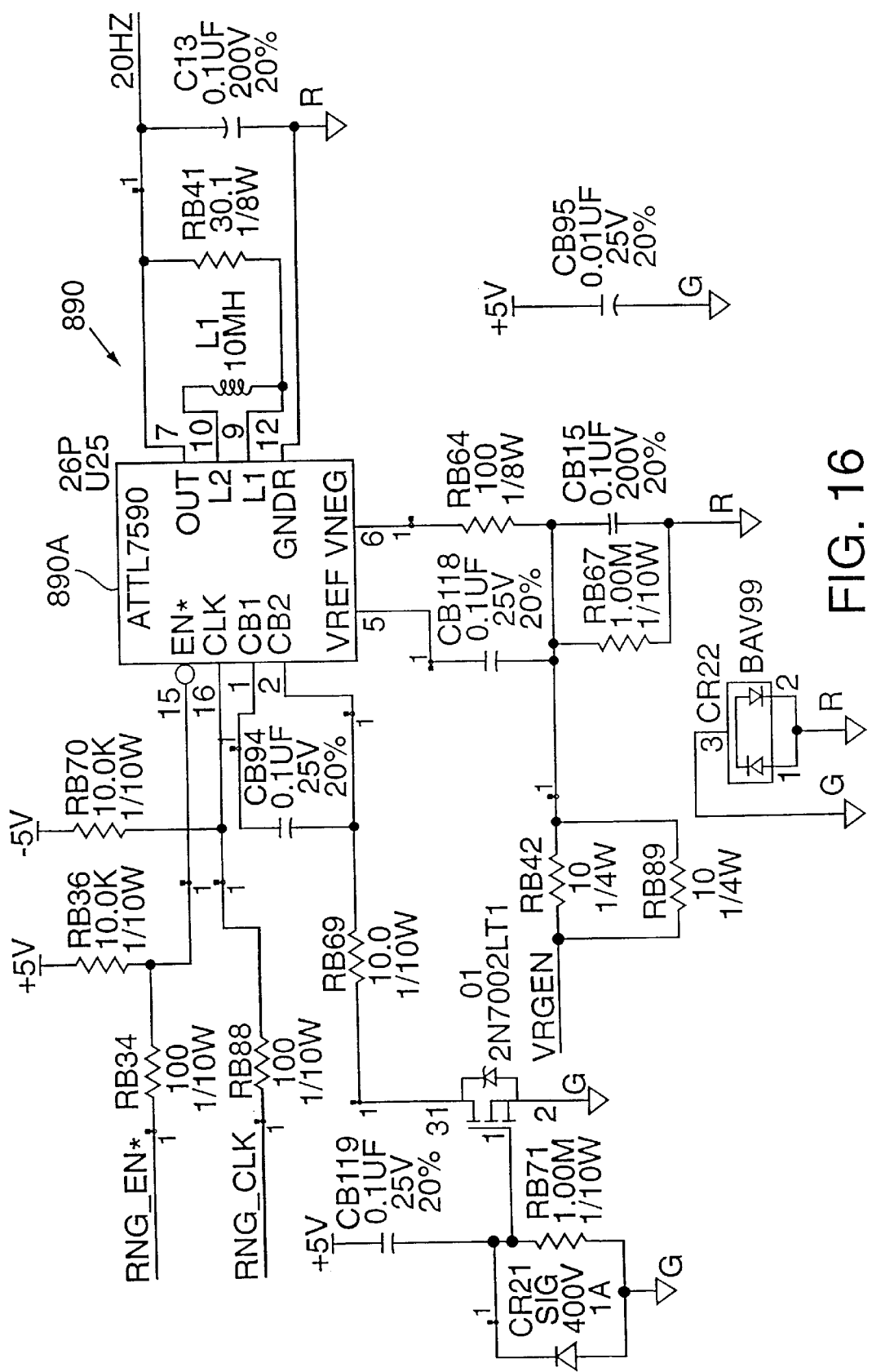
FIG. 16 illustrates the ring generator circuit used in the system.

A ringing generator is included on each UVG card 140A–D, which is capable of providing 40 V rms in to a 5 ringing equivalent (REN) load. Ring generator circuit 890 is illustrated schematically in FIG. 16 and is illustrated in block diagram form in FIG. 3. Referring to FIG. 16, ring generator circuit 890 is implemented utilizing an Lucent Technology ring generator chip designated the L 7590, with associated electrical components as indicated. The output of ring generator 890 is provided over line 896.

Further reference to FIG. 3, UVG card 140A is shown in block diagram form. In FIG. 3, only one UVG circuit 812 is illustrated for simplicity, however it will be appreciated by reference to FIG. 2 that each UVG card includes three UVG circuits 812. Each UVG card includes a TIU ASIC circuit which provides interface between the BNUCC800 common control and the UVG circuits 812. In FIG. 3, the TIUA is indicated by reference character 880.

Figure 6:
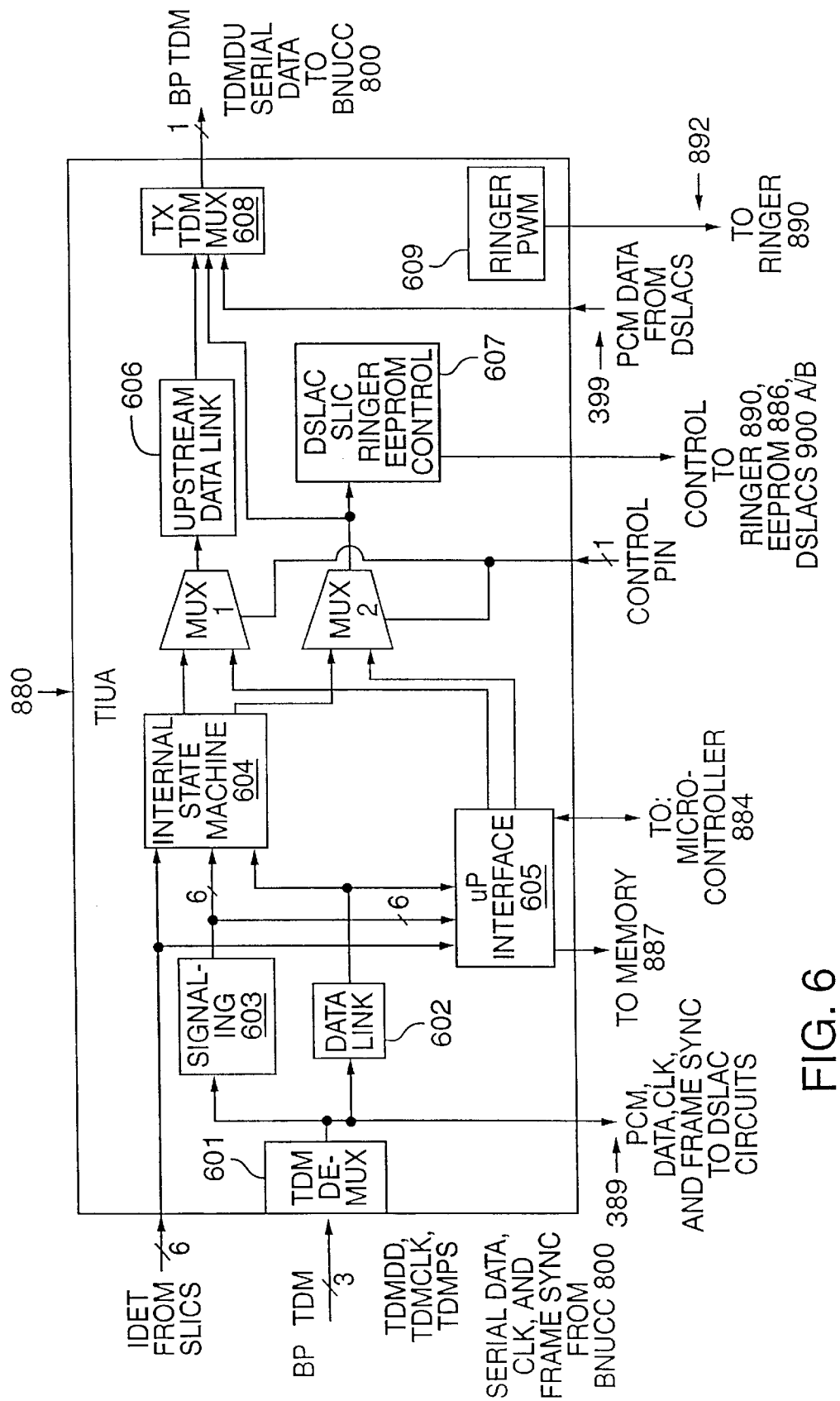
FIG. 6 shows a functional block diagram of the application specific integrated circuit utilized in a UVG card.

A better appreciation of the TIUA 880 will be had by reference to FIG. 6. Referring to FIG. 6, TIUA 880 is comprised of TDM demux 601 which receives from BNUCC 800 TDM data down (TDMDD), TDM clock (TDMCLK) and the TDM frame sync (TDMFS). TDM demux 601 puts out the various components of each frame, including the parity, splits out the signalling and data link information (the messaging) and the error bits. That information is carried both to the data link block 602 and the signalling block 603. The PCM data down flows out through 389 to the DSLAC™ circuits. The signalling information is on a per line basis, thus there are six lines of signalling flowing into the internal state machine 604 and also to the microprocessor interface 605. The data link information also flows into internal state machine 604 and iP interface 605. The data link data is updated every 500 microseconds as described below in the section describing the data link information. The data link information is comprised of four bytes, the command, two bytes of address, and one byte of data as illustrated in FIG. 9C. Two times in a superframe, every four regular frames, a new data link message is received.

A portion of the data link message is provided in each frame, and after receiving four of them, a complete message is assembled and is presented to both internal state machine 604 and to the microprocessor interface 605.

Figure 8:
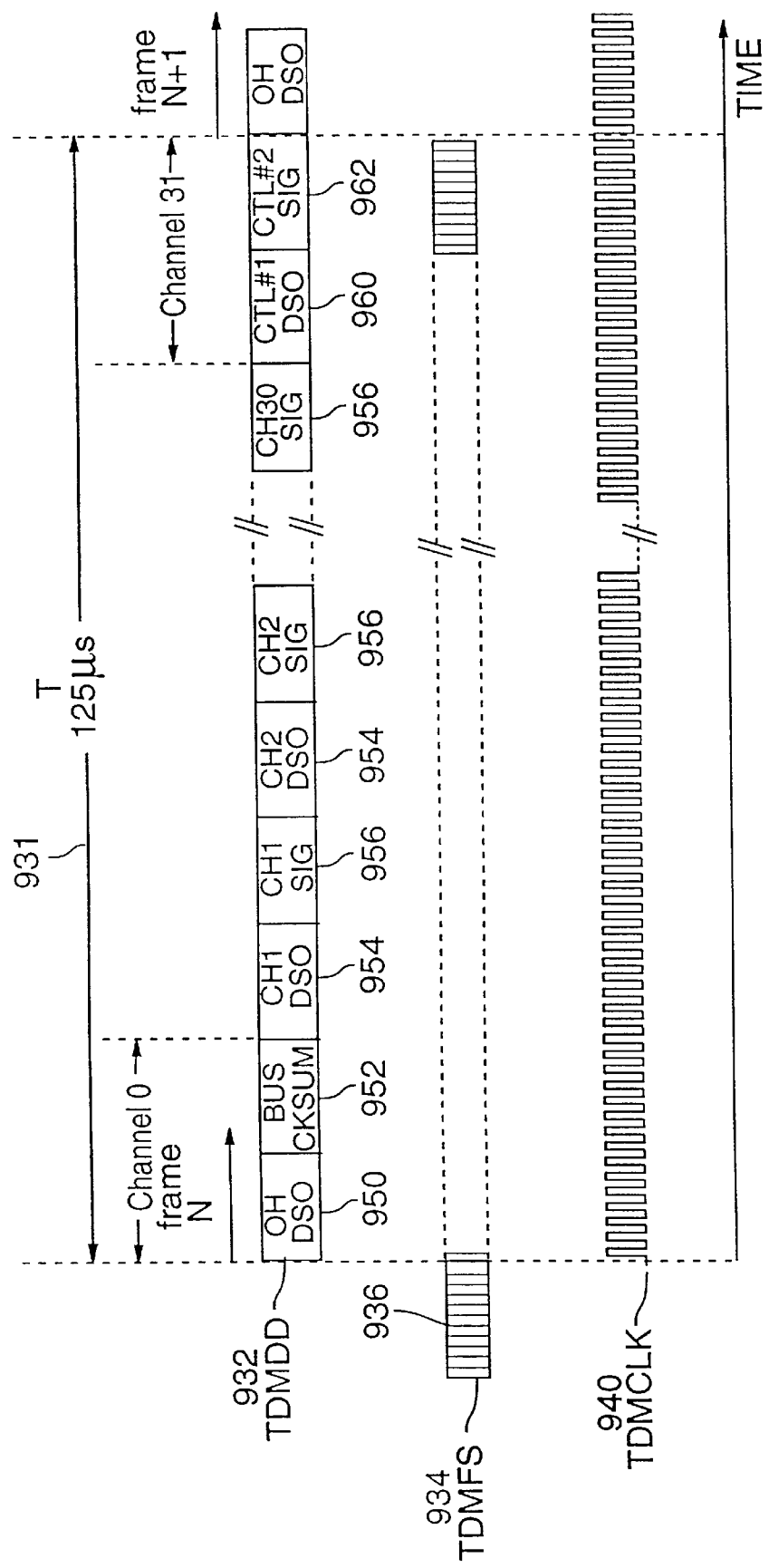
FIG. 8 shows a format for the serial data bus which couples the broadband network unit common control to the UVG cards.

FIG. 8 describes an entire frame and shows that in channel 31 there is a control number 1 (CTL#1) and control number 2 (CTL#2). For each frame, frame 1 through 8 of the superframe, there is associated a piece of the data link message, either command, a high address, low address, or data. TDM demux 601 keeps track of what frame it is in, and builds the data link message out of four of these submessages and presents that to both the internal state machine 604 and to the microprocessor interface 605. The signalling is updated each frame and that is associated with the channels one through six.

TIUA 880 is configured such that the UVG line card may be controlled either by internal state machine 604 or through the use of microcontroller 884 in conjunction with TIUA 880. The control pin determines which of the two controls the remaining part at line card circuit. Microcontroller 884 interfaces to iP interface 605 and its own memory, and can read and write registers inside the TIUA 880. If the control pin is set to allow internal state machine 604 to have control, microcontroller 884 will not have any effect on the upstream data link 606 or the DSLAC, SLIC, ringer and EEPROM control 607. By having both the iP interface 605 and the internal state machine 604 going to MUX1 and MUX2, then the choice of which one is passed is controlled by a control pin.

Upstream data link 606 contains the immediate four bytes received from either microcontroller 884 or internal state machine 604 and feeds those into TX TDM MUX 608. TX TDM MUX 608 creates the up data. PCM data and data link messaging all pass through TX TDM MUX 608 and go upstream to the BNUCC 800. There is also control of the data from the DSLAC™ circuits, the SLICs and the ringers being based off either of the controllers.

TX TDM MUX 608 takes in the PCM data from the DSLAC™ circuits and puts it into channel 1, channel 2, and channel 3 of the upstream frame. TX TDM MUX 608 also takes the upstream data link and places it into channel 31. And TX TDM MUX 608 also takes in the upstream signalling information from the control out of mux 2 and places that in the correct channels, channel 1, channel 2, and channel 3.

Thus TX TDM MUX 608 has these three data inputs that are available to it, and substitutes that information in at the correct time slots to create the upstream frame illustrated in FIG. 8.

Finally, ringer PWM 609 creates a pulse width modulated signal which is an (inaudible) input to ring generator 890. The output signal from ringer PWM is a 20 hertz signal which describes a trapezoid and feeds into the ring generator 890 which creates a high voltage signal representing that pulse width modulated signal.

The netlist for TIUA 880 is set forth in the microfiche Appendix which is part of the present disclosure. Information being provided to TIUA 880 from the BNUCC 800 is provided over bus 882A, which is a four conductor bus and carries the signals indicated in FIG. 7 which will be described below.

Figure 17A:
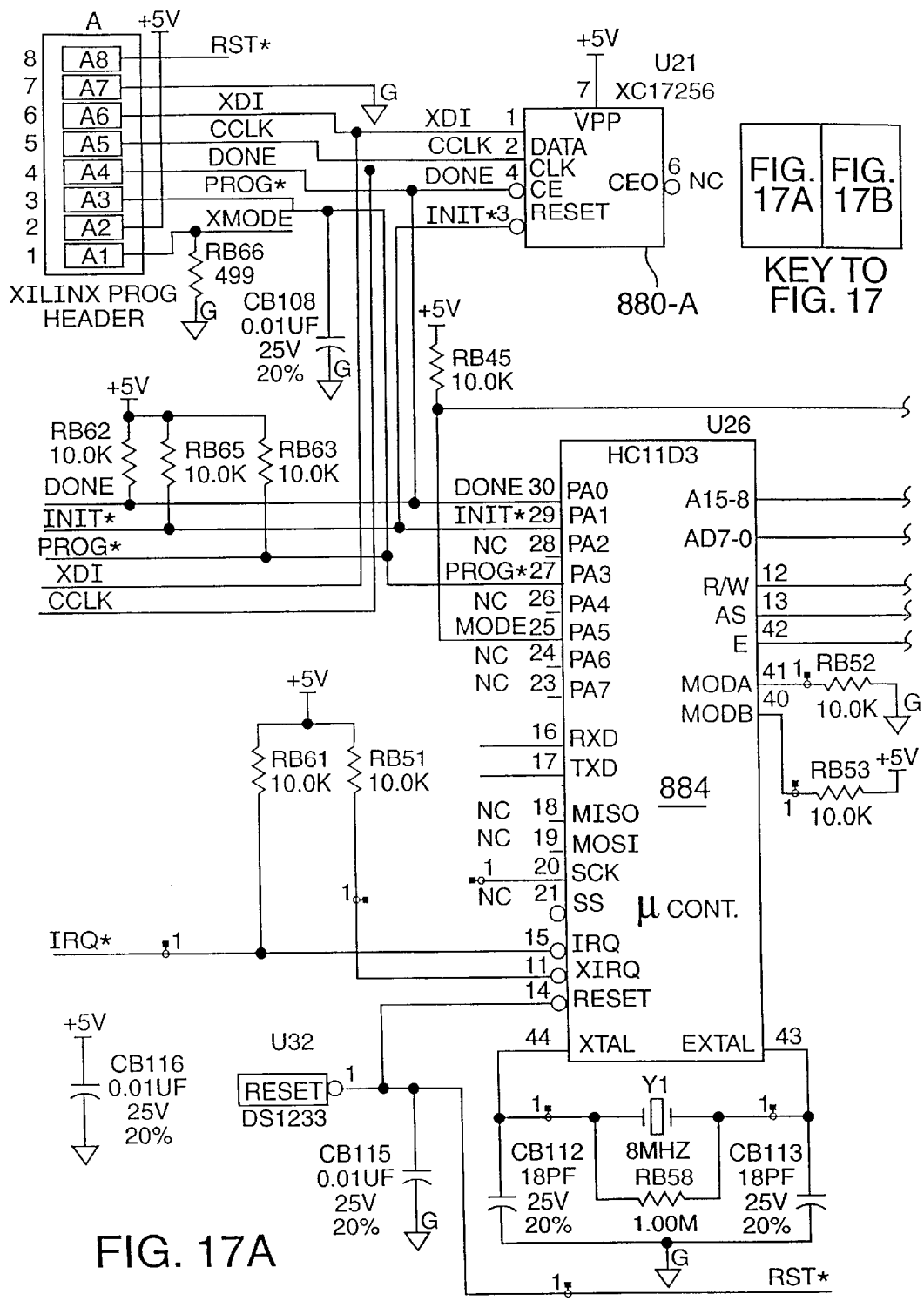
FIG. 17, which is comprised of FIGS. 17A and 17B arranged as illustrated in the key to FIG. 17, illustrates the microcontroller, an SRAM and a PROM used in the system.
Figure 17B:
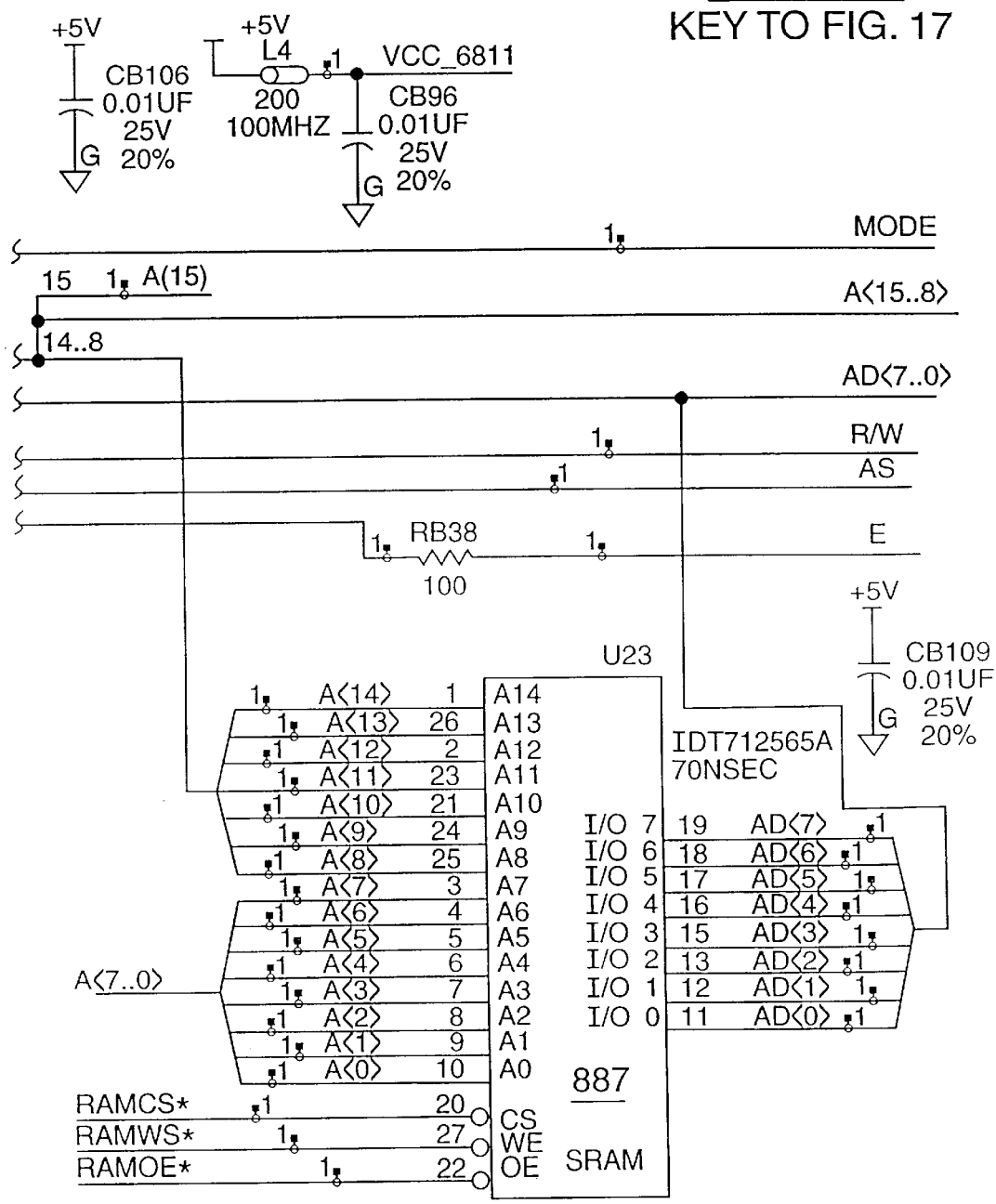

In addition to the TIUA 880, each UVG card also includes a microcontroller and SRAM. For UVG card 140A, these are indicated respectively by reference characters 884 and 887. Circuit diagrams for the microcontroller 884 and SRAM 887 are illustrated in FIG. 17 microcontroller 884 may be implemented using generally available products such as for example a Motorola 68HC11D3 microcontroller which is the device illustrated in FIG. 17. Also illustrated in FIG. 17 is SRAM 887 which in this embodiment is a 32K×8 SRAM. A suitable SRAM for this purpose is an Integrated Device Technology SRAM denoted IDT 712565A. Of course other manufacturer's devices having the indicated source capacity may also be used as a substitute.

Figure 18B:
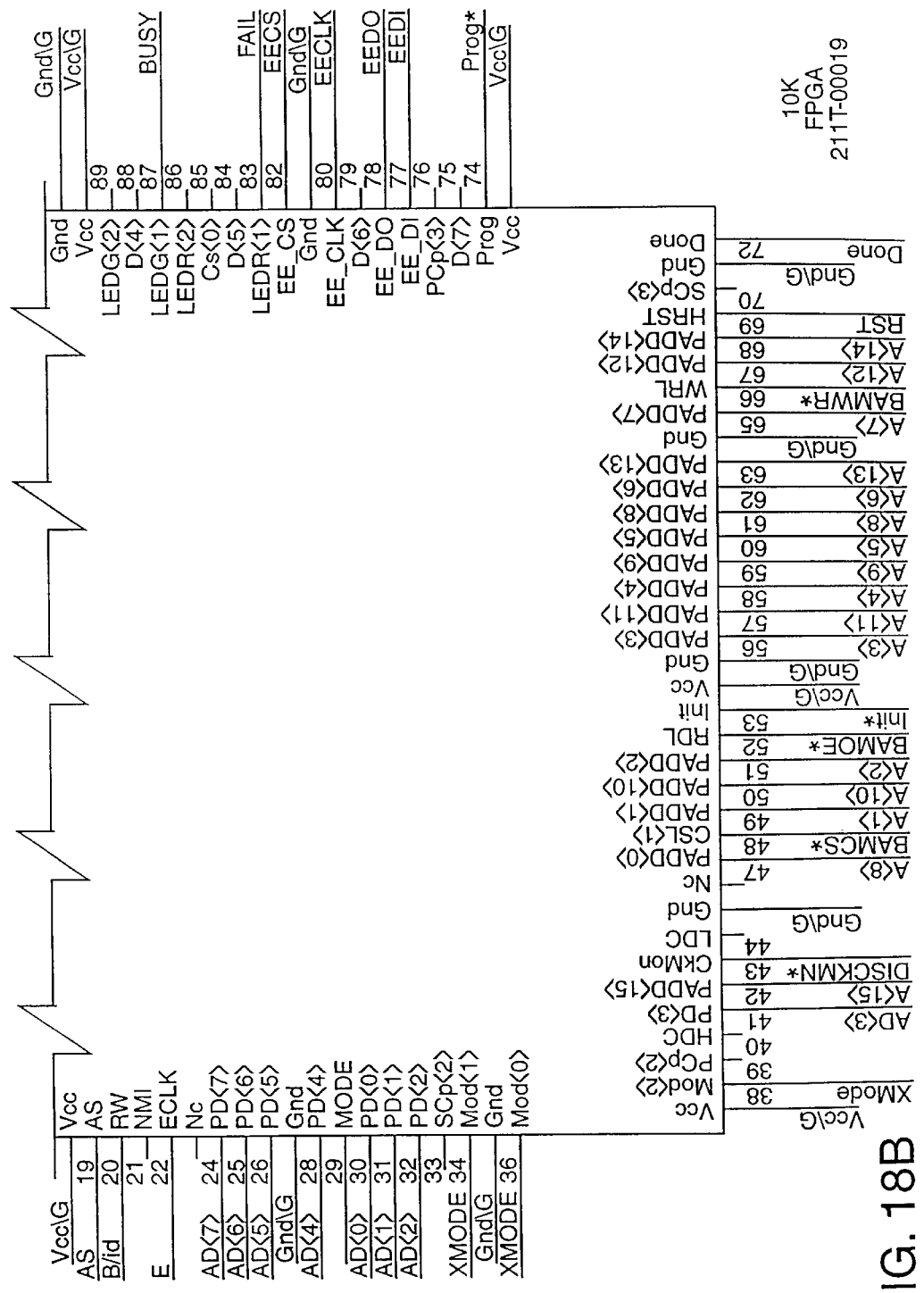
FIG. 18, which is comprised of FIGS. 18A and 18B arranged as illustrated in the Key to FIG. 18, illustrates the TIUA used in the system.

The TIUA 880 may be implemented using for example a 10K gate FPGA such as that illustrated in FIG. 18. The device illustrated in FIG. 18 may be purchased from Xilinx Corp., the device illustrated in FIG. 18 being a XC 5210 device.

Figure 19:
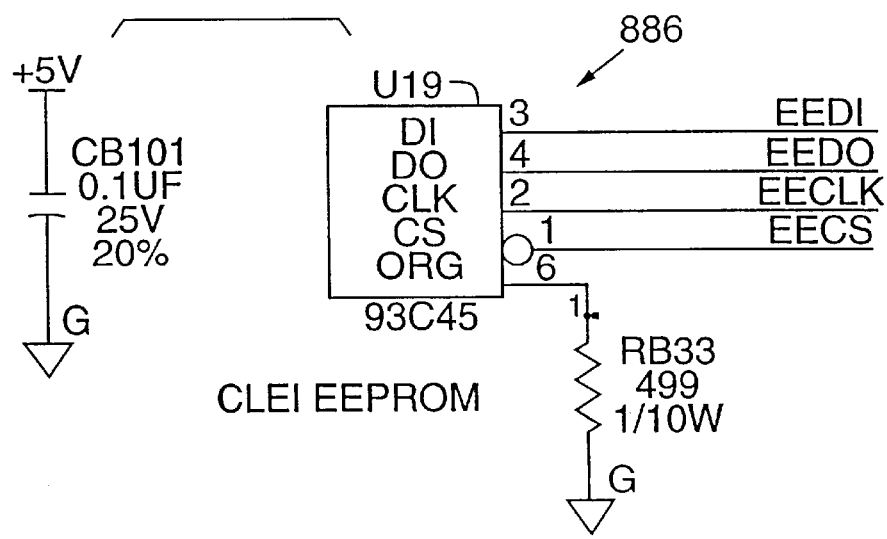
FIG. 19 illustrates the identification memory, implemented by an EEPROM, used in the system.

The EEPROM utilized in the line card may be for example a 93C46 device from a supplier such as Atmel or SGS Thomson, National Semiconductor which is illustrated in FIG. 19.

Turning to UVG circuit 812 illustrated in FIG. 3, it will be noted that a dual subscriber line audio processing circuit device, indicated by reference character 900A/B, is coupled to TIUA 880. Device 900A/B converts the PCM signals received from TIUA 880 to analog signals which are supplied to subscriber line interface circuits indicated as 906A and 906B, which will be described below. Device 900A/B may be implemented utilizing any commercially available circuitry such as a chip from Advanced Micro Devices denoted the Am79C031. Advanced Micro Devices uses the term DSLAC™ as a trademark for its dual subscriber line audio processing circuit devices. For convenience, the term DSLAC™ is used when referring to circuit 900A/B. The Advanced Micro Devices AM79C031 device is described in detail on pages 2-73 through 2-116 of its data book Publication No. 09875, Rev. G: Amendment 10, issue date December 1994, which is incorporated herein by reference in its entirety. An alternate design choice for a dual audio line subscriber audio circuit is the Siemens SiCoFi device.

DSLAC™ device 900A/B utilizes a simple 4-wire PCM interface for audio and a second 4-wire serial command interface for programming, and SLIC control/status. TIUA 880 provides all the PCM and Control interface signals with the control and status information being available through registers.

Figure 5A:
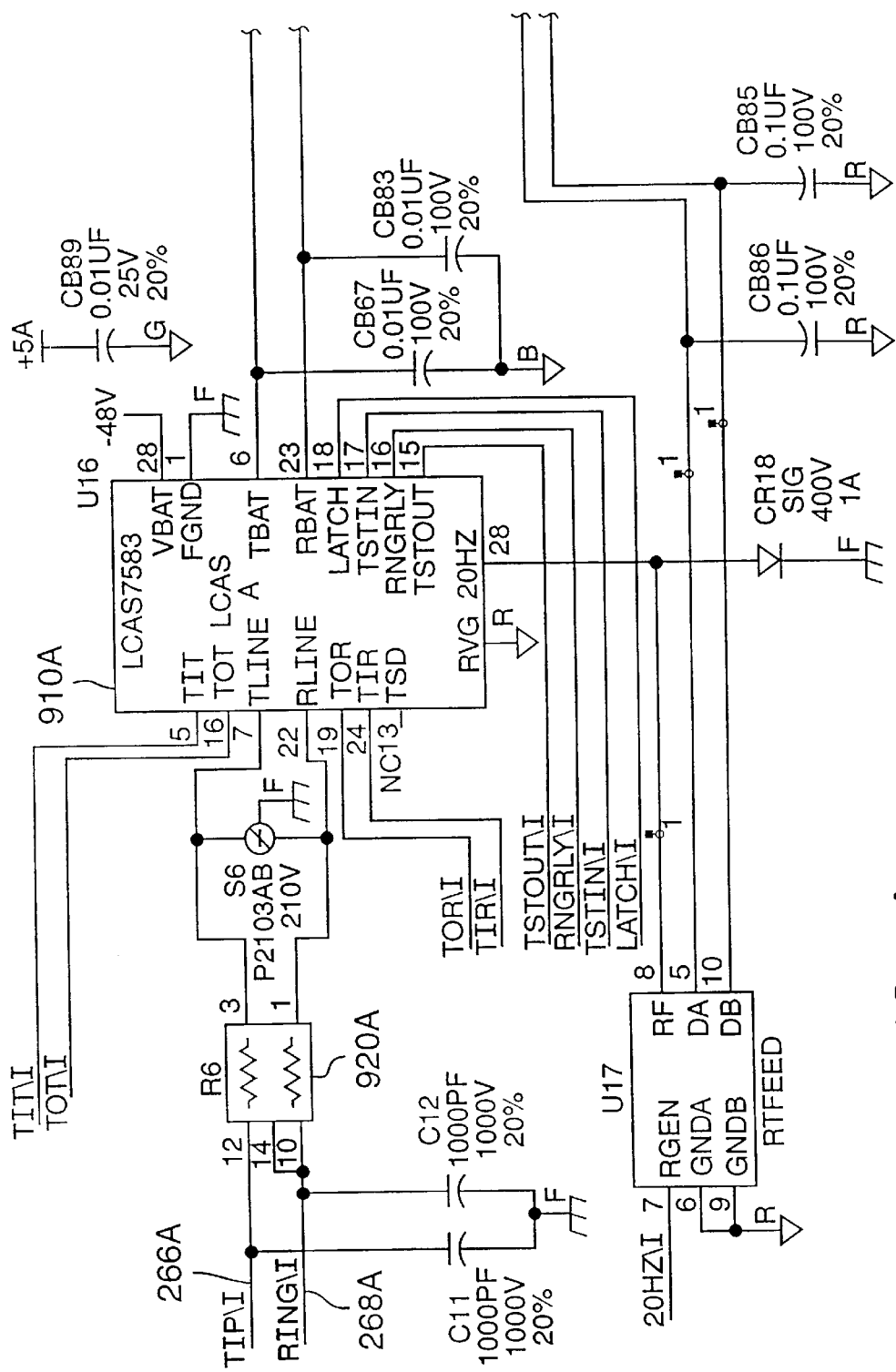
FIG. 5, which is comprised of FIGS. 5A, 5B, 5C, 5D and 5E arranged as illustrated in the Key to FIG. 5, shows the electrical schematic of a portion of one UVG card.
Figure 5B:
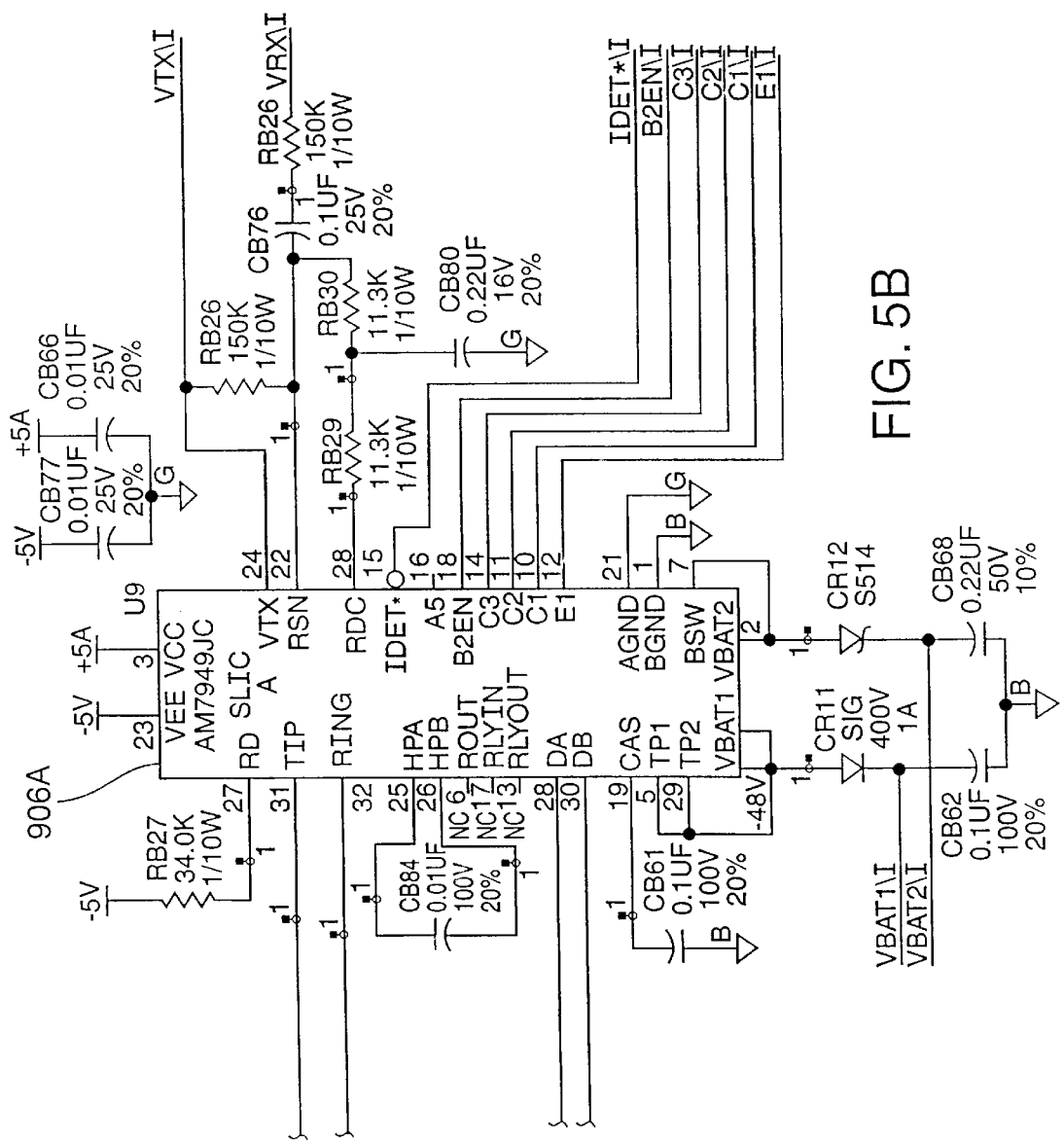
Figure 5C:
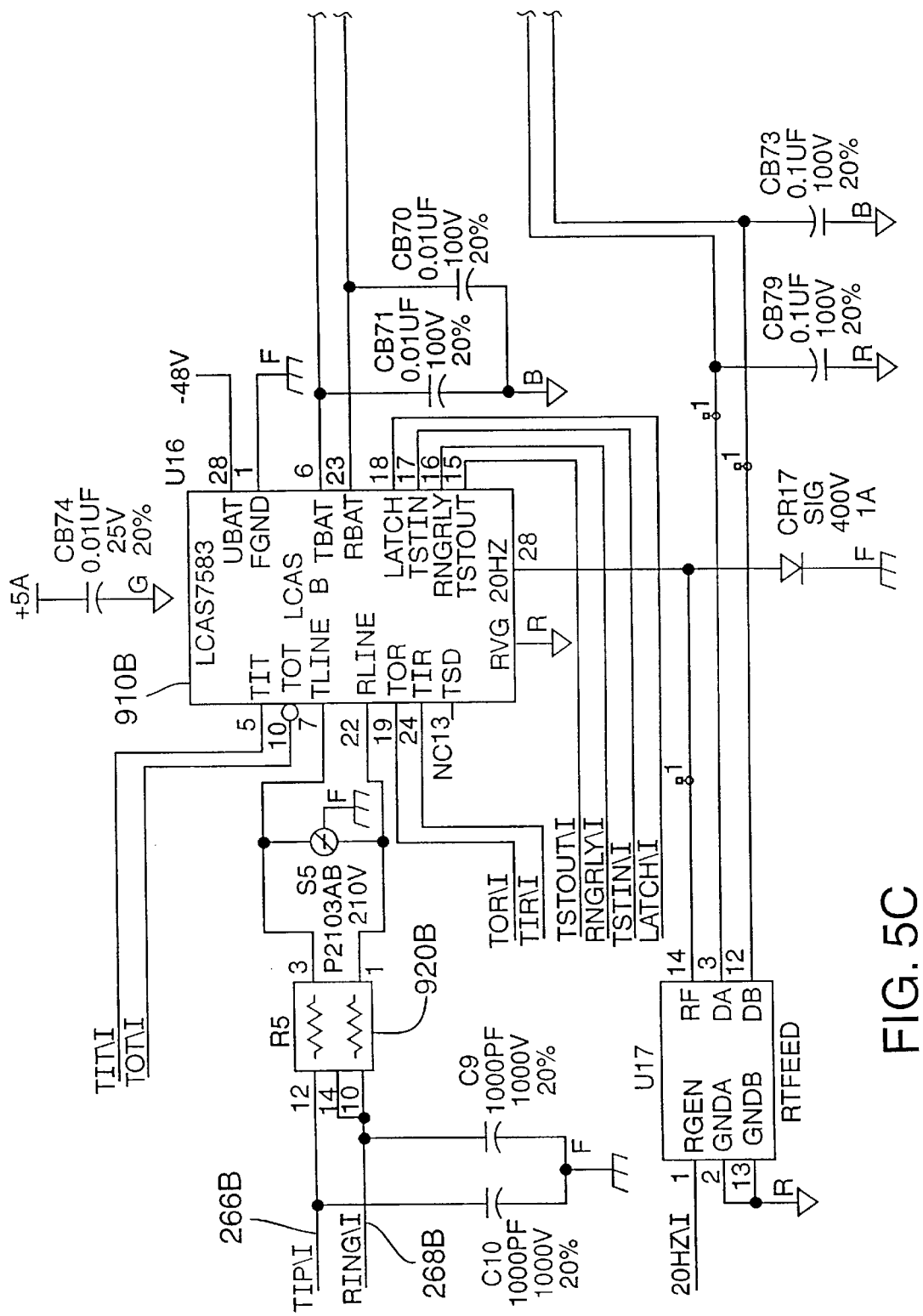
Figure 5D:
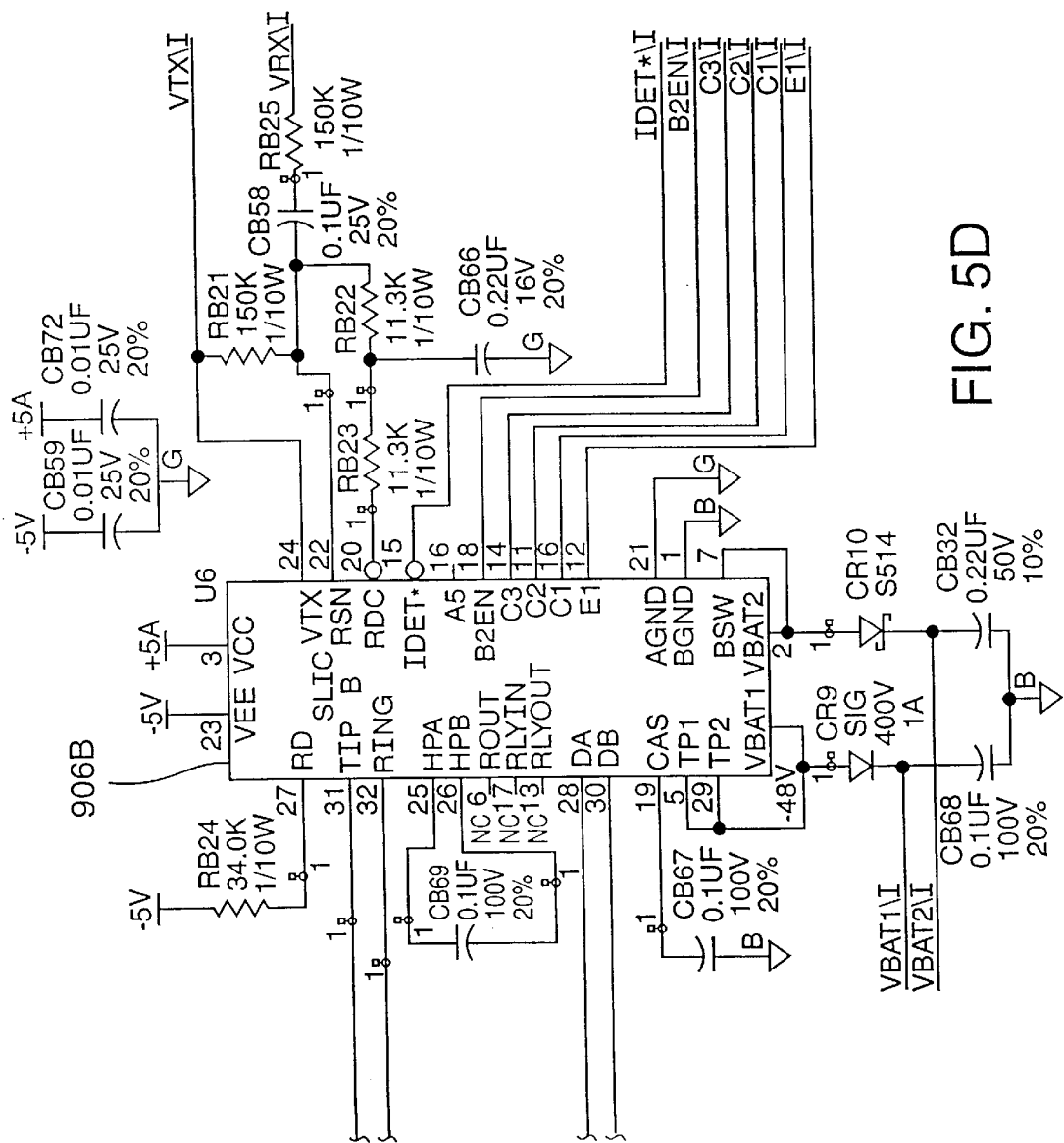
Figure 5E:
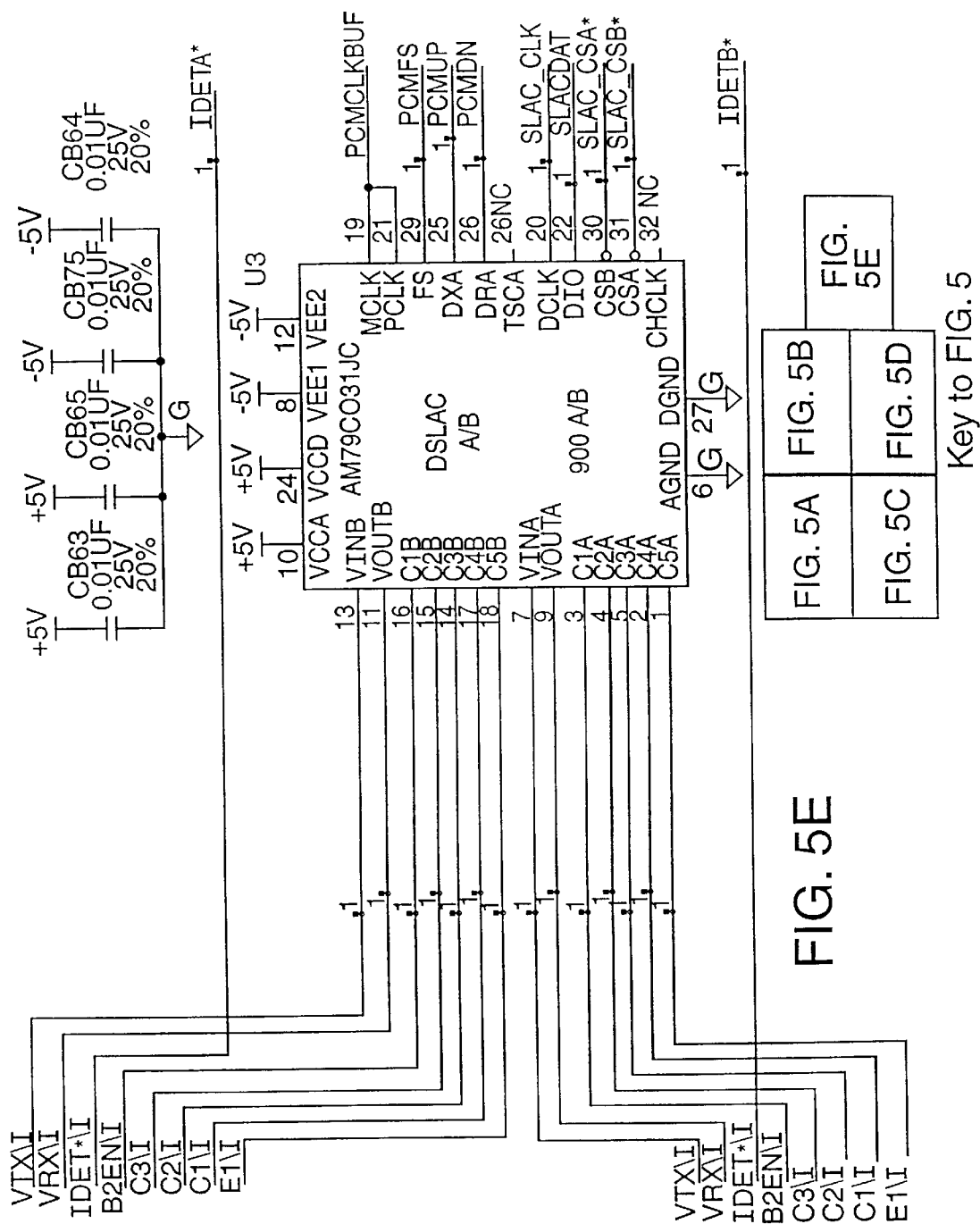

As illustrated in FIG. 5E, the PCM interface consists of the two PCM highway signals indicated as PCMUP and PCMDN, a 4.096 MHz clock indicated as PCMCLKBUF, and a frame sync indicated as PCMFS. The frame sync signal is a Start of Frame indicator, and DSLAC™ device 900A/B provides a Time Slot Assignment Circuit with provisional registers to allow for full programmability. The DSLAC™ device 900A/B also allows for up to 7 clock delays in either the transmit or receive PCM; used in conjunction with the byte oriented TSAC, this allows for a programmable bit-offset of the PCM in both directions, relative to the SOF marker. All of these functions are accessible through the serial data link via microcontroller 884 and TIUA 880.

A control interface is used for a combination of real-time and non real-time information. At startup, it is used to configure the DSLAC™ device circuit 900A/B internal DSP. During service, it is used to power up and power down the appropriate sections of the DSLAC™ device. During calls, it is used to control control bits to SLIC A and SLIC B.

The control interface consists of four signals: data (bi-directional), clock, and two chip selects—one for each channel. Multiple DSLAC™ device channels can be addressed at one time by activating multiple CS leads simultaneously. These leads are controlled by microcontroller 884 via a register within the TIUA 880. For obvious reasons, only one DSLAC™ device channel may be read at any time.

All commands written to the DSLAC™ device which require additional bytes to be input must have those bytes sent as the next N bytes. Any command which expects to see data output from the DSLAC™ device must see those bytes as the next N bytes on the interface. No further input command bytes will be accepted by the DSLAC™ device until all N bytes have been output by the DSLAC™ device. See the AMD data sheet for a description of the valid DSLAC™ device commands. Note that not all commands have additional bytes associated with them. In general, write commands are at even command values, and read commands are at odd command value within the DSLAC™ device circuit 900A/B.

The DSLAC™ device provides 5 general purpose I/O pins to control the SLIC functions. These pins are accessed through the serial interface. All five pins can be provisioned as either inputs (default at reset) or outputs. The mapping of the C bits from DSLAC™ device 900A/B to the input pins on SLIC A 906A and SLIC B 906B is shown in Table 2. All five pins are used as outputs.

TABLE 1

| DSLAC™ Device Control Interface | |
|---|---|
| DSLAC™ Device Signal | SLIC Control Bits |
| C1A/B | C1 |
| C2A/B | C2 |
| C3A/B | C3 |
| C4A/B | BSW |
| C5A/B | E1 |

The outputs from DSLAC™ device 900A/B in the inputs to subscriber line interface circuits 906A and 906B are illustrated in FIGS. 5B and 5F. Subscriber line interface circuits 906A and 906B may be implemented utilizing commercially available devices such as the Advanced Micro Devices' product denoted Am7949. The Advanced Micro Devices Am7949 subscriber line interface circuit is described in detail on pages 1-141 through 1-156 of their data book Publication #:18507, Rev:A Amendment:10, issue date:December 1994, which is incorporated by reference herein in its entirety. Circuits 906A and 906B are illustrated in FIGS. 5B and 5D respectively, each functioning with an associated line card access switch indicated at 910A and 910B respectively to provide POTS service to lines 260A and 260B.

Each SLIC provides a constant current battery feed to the subscriber loop, which shall be programmed to provide 22 mA out to a TER of 450Ú (given the tolerances of the SLIC current feed, this will guarantee 20 mA of loop current). Each SLIC also performs loop sense and ring trip detection, tip and ring polarity reversals, provides ring relay drivers and provides a battery switch function to allow two different battery voltages to be used. Each UVG card 140A–140D uses two different battery voltages, one for the Standby (Idle) state, and one for the Active state; this results in a lower overall power consumption for the circuit than if only one battery voltage were used. The SLIC also performs 2–4 wire VF coupling. The receive (D-A) signal is input to a current summing node {RSN, current gain=00}, along with a DC feedback voltage from the line drivers. The transmit signal Vtx is coupled directly into the DSLAC™'s device transmit amplifier.

Internal to each SLIC, there is a loop current detector, a ground-key detector and a comparator for ring trip detection. The output of these detectors is combined internally to form the IDET signal. The active detector is selected via the control leads C1–C3, the E1 lead. These leads also determine the state of the ring relay driver {"Ringing" state, 001}, polarity reversal, tip open, or tip and ring open circuited. See Table 1.

TABLE 2

SLIC Control States

| C3 | C2 | C1 | SLIC STATE | IDET OUTPUT E1 = 1 | IDET OUTPUT E1 = 0 |
|---|---|---|---|---|---|
| 0 | 0 | 0 | OPEN CIRCUIT | Ring Trip | Ring Trip |
| 0 | 0 | 1 | RINGING | Ring Trip | Ring Trip |
| 0 | 1 | 0 | ACTIVE | Loop Det. | Ground Key |
| 0 | 1 | 1 | ON-HOOK TRANS. [OHT] | Loop Det. | Ground Key |
| 1 | 0 | 0 | TIP OPEN | Loop Det. | Ground Key |
| 1 | 0 | 1 | STANDBY | Loop Det. | Ground Key |
| 1 | 1 | 0 | ACTIVE POL REVERSE | Loop Det. | Ground Key |
| 1 | 1 | 1 | OHT POL REVERSE | Loop Det. | Ground Key |

The E1 lead selects between a Loop Detector (measures sum of current in Tip and Ring leads) and a Ground Key Detector (measures current only in the Ring lead).

Two batteries are provided for the SLIC, one for on-hook conditions (approximately −50 Vdc), and the other for off-hook conditions (approximately −24 Vdc). The primary reason for having the higher battery voltage in the on-hook condition is for compatibility to the Mechanized Loop Testing ("MLT") equipment that the regional Bell Operating Companies use. In the BNU application as illustrated in FIG. 1 this requirement does not apply. Switching between the two battery voltages is controlled by the BSW pin on the SLIC, with a logic high enabling the on-hook battery, and a logic low enabling the off-hook battery.

Microcontroller 884 controls C1, C2, C3, and BSW signals through the C bits of DSLAC™ device 900 A/B. The IDET output from the SLIC 906A/B will be read via a status register in TIUA 880.

There are three relay functions in the UVG circuit; these functions are provided by a Lucent Technology solid state relay indicated in FIGS. 5A and 5C by Lucent Technology part number 7583, which are discussed in the description of the line card access switches (LCAS) 910A and 910B. Each SLIC has two built-in relay drivers available. One is controlled by the C1–C3 control bits, and is activated when the SLIC is in the RINGING state (C3C2C1=001). The second has a separate control input to the SLIC. Both drivers are essentially open collector NPN transistors, with a 7.2V zener diode snubber to ground for protection against back EMF from EMR coils. Due to a polarity mismatch in the Ring Relay driver output, the Ring Relay in the LCAS is driven directly from TIUA 880.

The ring trip circuit is composed of a comparator in the associated SLIC which senses the current through a 100Ú ringing feed resistor. It uses a pair of RC networks across the inputs to the comparator which filter out the AC portion of the ringing signal. The comparator input (DA) on the more positive side of the ringing source will be more positive than the input (DB) on the more negative side of the ringing source for an on-hook line. When the line goes off-hook, the voltage at DB remains relatively constant and the voltage at DA drops so that the difference of the two voltages reverses polarity and the comparator output changes from high to low.

Additional filtering is required to protect against short transients on IDET when switching ringing on or off; this may require a routine in the software to completely ignore the IDET signal lead for as much as 50 msec following the removal of ringing, in order to allow the energy stored in the line and ringer s to discharge. The ring trip comparator is automatically switched in and out of the circuit by the SLIC, based upon the status of the control leads.

External components are used in connection with each SLIC to program the output level of the constant current source and also to set the current detection value of the loop current detector. The constant current source's output level is determined by two resistors, RDC1 and RDC2. These resistors are connected between the RSN& RDC pins on the SLIC. The battery feed circuit produces a voltage of 2.5V at RDC {−2.5V for normal polarity and +2.5V for reverse polarity}. The current level output by the feed circuit is determined by the following relationship:

$$I_{FEED}=(2.5*200)/(RDC1+RDC2)$$

Making RDC1 and RDC2 both equal to 11.3 Kohms will provide approximately 22 mA of loop current.

A capacitor (CDC) connected to the mid-point of the two RDC resistors controls the speed at which the battery feed circuit reacts to the changes in the condition of the loop {such as during polarity reversals; or when switching from the Ringing state to the Active state after a ring trip, when the current feed is trying to switch from an open loop condition to a closed loop feed condition.} According to AMD, this capacitor should be chosen such that the time constant produced by CDC and RDC1/RDC2 is approximately 1.5 msec. This equates to a 0.27iF capacitor.

The loop detector trip threshold is set by resistor Rd. The RD pin has a current output which is equal to the loop current divided by 292; the internal detector has a threshold set to 1.25V by an internal reference. The voltage at the RD pin is therefore equal to the current times Rd:

$$(I_{thresh}/292)*Rd=1.25$$

or $$Rd=365/I_{thresh}$$

A capacitor Cd may be added to provide some delay in on-hook to off-hook time in order to partially filter switching transients, and is typically chosen for 0.5 msec of delay. However, no capacitor is used on the TIU RD lead since IDET filtering is being provided elsewhere.

As will be appreciated by reference to FIG. 3 and FIGS. 5A, 5B, 5C, 5D and 5E, line card access (LCAS) circuits 910A and 910B respectively are used to couple SLIC A 906A and SLIC B 906B to subscriber lines 260A and 260B respectively. LCAS 910A and 910B may be implemented using conventionally available circuitry such as that from AT&T and indicated by part number ATTL7583 (which is shown in schematics of FIGS. 5A and 5C.)

There are three functions in the UVG circuit 812 that require relay operations: one is ringing, and the other two are to provide Test-In and Test-Out access to the CIRCUIT and the DROP. The LCAS circuits provides all three of these relay functions, plus built-in SLIC protection, current limiting and thermal shutdown.

The ring relay portion of the LCAS also provides a zero-current cross switch mechanism on release. This eliminates the need for external circuitry to perform this function, and should serve to minimize impulse noise within the system. Ideally, ringing should be applied at a zero-voltage cross, and removed at a zero current cross. The LCAS satisfies the zero-current turn-off requirement; due to low level of the ringing value used, the zero-voltage turn-on is not as critical as the zero-current turn-off.

In the talk state, the LCAS provides approximately 20Ù of matched impedance into the tip and ring leads. This will tend to provide some current limiting for the SLIC in the event of an overvoltage/overcurrent condition on the line. By controlling the order and timing of operation of the control leads to the LCAS, either make-before-break or break-before-make operation can be accomplished. The UVG card is operated in the break-before-make mode.

The LCAS provides several protection functions. The switches will dynamically current limit to about 2.5 A for a fast lightning surge and thermally to 250 mA during a slower power cross condition. During an extended power cross, the switches will open completely and enter thermal shutdown mode. In addition, a diode bridge offers tertiary protection by bridging small overvoltage conditions to ground and battery and high-current overvoltage conditions to ground.

The functions of the LCAS are controlled via the Testin, Testout, and Ringing control leads. These signals will be driven from a control register in the TIUA ASIC and are common to all six lines on the TIU card; each LCAS has a transparent latch built-in, and this latch is controlled by six RLYLNSEL signals from the TIUA. The following table shows the relationship of the control inputs to the switch states.

lightning strikes. Thick film or wirewound fusible protection resistors are typically used. A suitable design choice for a line feed resistor in line feed section 920A is a 50Ù thick film resistor on a ceramic substrate. As disclosed in FIG. 3, line feed section 920B (which is of the same construction as 920A) is used for line 260B.

A gas tube or carbon block device at the premises 175 is used in conjunction with the transient over-voltage protector 918 and line feed section to provide over-voltage protection. Line feed section 920 presents sufficient resistance such that in the event of a lightning strike the voltage at the premises will remain sufficiently high to activate the gas tube or carbon block in addition to activating transient over-voltage protector 918.

UVG card connectors 860 allow connection of the UVG card to backplane interconnects 808 which provide connectivity to the BNUCC 800. The backplane interconnects 808 provide connections to a number of signals including data buses which contain telecommunications data for subscribers as well as control information from the BDT 100 or the BNUCC 800, and power and ground for the UVG card itself.

Table 4 illustrates a typical pin usage for a 3×32 European DIN connector which can be used for the UVG card connector 860. Connector 860 is also illustrated schematically in FIG. 15.

TABLE 4

Pin Connections for UVG card connector 860

|    | ROW A | ROW B      | ROW C |
| -- | ----- | ---------- | ----- |
| 1  | VCC   | VCC_Pre[1] | VCC   |
| 2  | GND   | GND[1]     | GND   |
| 3  | VDD   | VDD_Pre[1] | VDD   |
| 4  | TCLK  | GND[1]     | TDD   |
| 5  | GND   | TFs        | TUD   |
| 6  | BpRst* | GND       |       |
| 7  | GND   |            |       |
| 8  | VAA   | VAA_Pre[1] | VAA   |
| 9  | GND   | GND        | GND   |
| 10 | VEE   | VEE_Pre[1] | VEE   |
| 11 | —     | —          | —     |
| 12 | VBB1  | VBB1_Pre[1] | VBB1 |

TABLE 3

| Line State | RING Input | TEST IN Input | TEST-OUT Input | TSD | BREAK Switch | Ring Switch | Test-In Switch | Test-Out Switch | Ring Test Switch |
| --- | --- | --- | --- | --- | --- | --- | --- | --- | --- |
| Idle Talk | 0 | 0 | 0 | 5 V/Float | On | Off | Off | Off | Off |
| Test Out | 0 | 0 | 5 V | 5 V/Float | Off | Off | Off | On | Off |
| Test In | 0 | 5 V | 0 | 5 V/Float | Off | Off | On | Off | Off |
| Test In/Out | 0 | 5 V | 5 V | 5 V/Float | Off | Off | On | On | Off |
| Ringing | 5 V | 0 | 0 | 5 V/Float | Off | On | Off | Off | Off |
| All Off | 5 V | 0 | 5 V | 5 V/Float | Off | Off | Off | Off | Off |
| Test Ringing | 5 V | 5 V | 0 | 5 V/Float | Off | Off | Off | Off | On |
| Test Ringing & drop | 5 V | 5 V | 5 V | 5 V/Float | Off | Off | Off | On | On |
| All Off | X | X | X | 0 V | Off | Off | Off | Off | Off |

A transient over-voltage protector 918A is used to protect the LCAS 910A from excessive voltages. Similarly, over-voltage protector 918B is used to protect LCAS 910B. A suitable design choice for the transient over-voltage protectors 918A and B is the Teccor P2103 200 V Sidactor.

Protector resistor 920A consists of two resistors, one in series with the tip (T) line 266A and one in series with the ring (R) line 268A which together form the twisted pair drop cable 260A. The line feed resistors serve to protect the UVG circuit from overvoltages, in particular overvoltages due to TABLE 4-continued Pin Connections for UVG card connector 860

|    | ROW A | ROW B       | ROW C |
| -- | ----- | ----------- | ----- |
| 13 | VBB2  | VBB2_Pre[1] | VBB2  |
| 14 | BGND  | BGND[1]     | BGND  |
| 15 | —     | —           | —     |

TABLE 4-continued

Pin Connections for UVG card connector 860

| | ROW A | ROW B | ROW C |
|---|---|---|---|
| 16 | FGND | FGND | FGND |
| 17 | RGND | — | VRNG |
| 18 | — | — | — |
| 19 | TIT | — | TIR |
| 20 | TOT | — | TOR |
| 21 | — | — | — |
| 22 | TIP A | — | RING A |
| 23 | — | — | — |
| 24 | TIP B | — | RING B |
| 25 | — | — | — |
| 26 | TIP C | — | RING C |
| 27 | — | — | — |
| 28 | TIP D | — | RING D |
| 29 | — | — | — |
| 30 | TIP E | — | RING E |
| 31 | — | — | — |
| 32 | TIP F | — | RING F |

Superscript 1 ($^1$) above indicates a First Level Contact early make pin.
—: Pin Removed TIUA 880 may be implemented utilizing a field programmable gate array (FPGA). In the system described herein, TIUA 880 is implemented utilizing a Xilinx Corporation FPGA 5210TQ144 chip which is illustrated in FIG. 18. It will of course be recognized that FPGAs from other manufacturers may be utilized in practicing the present invention. Table 5 below sets forth the signal name in, number of pins, and explanatory notes in a description of the signals related to the pin.

TABLE 5

| Signal Name | Pin # | # Pins | Note | IO | Description |
|---|---|---|---|---|---|
| TDMDU | 1 | 1 | BB | 0 | Upstream TDM serial data bus. (Individual) |
| TDMCLK | 1 | 1 | BB | I | TDM bus clock @ 4.096 MHz (Common) |
| TDMDD | 1 | 1 | BB | I | Downstream TDM serial data bus. (Individual) |
| TDMCTL | 1 | 1 | BB | I | TDM bus control (Common) |
| TDMFS | 1 | 1 | BB | I | TDM Composite Sync (Common) |
| TDMSP1 | 1 | 1 | BB | I/O | TDM Spare 1 (Common) |
| TDMSP2 | 1 | 1 | BB | I/O | TDM Spare 2 (Common) |
| RLYLNSEL [1:6] | 6 | 6 | RY | O | Select for six relays sharing a common data bus. |
| RLYTIN | 1 | 1 | RY | O | Test in relay control signal (Common to relays) |
| RLYTOUT | 1 | 1 | RY | O | Test Out relay control signal (Common to relays) |
| RLYRNG | 1 | 1 | RY | O | Ring relay control signal (Common to relays) |
| PCMDU | 1 | 1 | CD | I | Data Up from DSLAC ™ devices (Common) |
| PCMDD | 1 | 1 | CD | O | Data Down to DSLAC ™ devices (Common) |
| PCMFS | 1 | 1 | CD | O | Frame Sync for PCM bus |
| PCMCLK | 1 | 1 | CD | O | Clock for PCM bus. |

TABLE 5-continued

| Signal Name | Pin # | # Pins | Note | IO | Description |
|---|---|---|---|---|---|
| CO_DIO | 1 | 1 | CD | I/O | Codec Data In/Out |
| CO_CS [1:6]* | 6 | 6 | CD | O | Chip Select for Codec programming: Active Low |
| IDET [1:6] | 6 | 6 | | I | I Detect signals from the SLICs |
| RNG | 1 | 1 | | O | PWM signal for Ring Generator - 20 Hz Trapezoid |
| RNG_EN | 1 | 1 | | O | An active low control signal for powering down the ringer circuit. |
| EE_DI | 1 | 1 | EE | I | EEPROM Data in |
| EE_DO | 1 | 1 | EE | O | EEPROM Data out |
| EE_CLK | 1 | 1 | EE | O | EEPROM communications clock. |
| EE_CS | 1 | 1 | EE | O | EEPROM chip select (active high) |
| RST* | 1 | 1 | | | I/O Reset for TIUA. |
| RST_ | 1 | 1 | | O | Inverted Reset |
| P_ADDH [7:0] | 8 | 8 | P | I | Processor address in |
| P_DATA [7:0] | 8 | 8 | P | I/O | Processor data in/out |
| PCLK | 1 | 1 | P | I | Processor clock |
| P_ADDL [7:0] | 8 | 8 | P | O | Processor Low order address byte for use by other external devices. |
| P_RW | 1 | 1 | P | I | Processor Read/Write signal |
| P_AS | 1 | 1 | P | I | Processor Address Strobe signal |
| P_INT* | 1 | 1 | P | O | Interrupt to Processor (Active Low) |
| M_OE* | 1 | 1 | M | O | Memory Output Enable (Active Low) |
| M_WR* | 1 | 1 | M | O | Memory Write (Active Low) |
| M_CS* | 1 | 1 | M | O | Memory Chips select/ (Active Low) |
| VCC | 12 | 12 | | I | 4 core + 0 ÷ 4 |
| GND | 12 | 12 | | I | 4 core + 0 ÷ 4 |
| LEDR | 1 | 1 | | O | RED LED Driver - Low when light should be on. |
| LEDG | 1 | 1 | | O | GREEN LED Driver - Low when LED should be on. |
| DSCKMN | 1 | 1 | | I | |
| CN_GND_DET | 1 | 1 | | I | Coin line GND Detect |
| CN_VLT_SLT | 1 | 1 | | O | Coin Voltage Select |
| CN_POLARITY | 1 | 1 | | O | Coin ti Polarity |
| CN_VLT_APP | 1 | 1 | | O | Coin Voltage Apply |
| TEST | 1 | 1 | | I | Test Mode |
| SAFE_CLOCK | 1 | 1 | | I | Clock for test mode. |
| MODE | 1 | 1 | | I | Mode select pin. Processor run or internal state machine. |
| Total | | 107 | | | |

In Table 5, the notation BB indicates backplane signals, CD indicates DSLAC™ device signals, P indicates processor signals, EE indicates EEPROM signals, and M indicates memory signals.

In addition to TIUA 880, a serial PROM, which may be a Xilinx Corporation part number XC17256, is utilized in connection with the programming. This serial PROM is illustrated in FIG. 17 and indicated by reference character 880-A.

In addition to the signal and power pins set forth above in Table 5, Table 6 below indicates the pins required for programming along with the signal name. The table also includes a description of the programming function being performed as well as whether the pin is an input/output or both.

TABLE 6

| Signal Name | Pin # | IO | Description |
| --- | --- | --- | --- |
| PROG | 74 | I/O | Pulling this low starts a program cycle. It has an internal pull up. It is not needed for power up configuration, since the Xilinx will automatically load on power-up. It might be useful to connect it to the HC11, however not necessary. |
| CCLK | 107 | O | This is the clock for downloading. It should be connected to the PROM. |
| DIN | 105 | I | Serial data in from the PROM. |
| DONE | 72 | I/O | High state indicates finished programming. As an input it is capable of delaying the programming process. This pin should be connected to the low asserting chip select of the PROM. |
| INIT_ | 53 | I/O | An external pull-up resistor is recommended for this pin (5k). This output low indicates an error occurred during load. It can be connected to the reset pin of the PROM in order to start the address counter over. |
| M0, M1, M2 | 36, 34, 48 | I | These are mode pins which set the Xilinx chip for which type of download is to be used. For serial master mode they all should be grounded. If this mode is used for lab serial download then these can be hardwired. |
| HDC | 40 | O | High During Configuration. This pin can be used as regular I/O during normal operation, or can be used for the HDC signal only, or not at all. This signal might be useful to the processor for knowledge about the current state of the ASIC. |
| LDC | 44 | O | High During Configuration. This pin can be used as regular I/O during normal operation, or can be used for the LDC signal only, or not at all. This signal might be useful to the processor for knowledge about the current state of the ASIC. |
| Total | 10 | | |

The communications between BNUCC 800 and its associated UVG card 140A is provided over bus 882A as illustrated in the FIGS. 2 and 3. Referring to FIG. 3, the communication channel includes on a first lead downstream TDM information indicated by TDMDD, providing data for the six subscriber lines. The second channel, the upstream TDM serial bus, is indicated by TDMDU, contains data from the six subscriber line circuits in control and query inserts for the BNUCC800. This bus is tristated when TIUA 880 is not actively driving data onto the bus. This allows other cards to share this bus.

Next, a clock signal is provided to the TIUA 880 over bus indicated TDMCLK, this being the main system clock which operates at 4.096 MHz. Finally, a sync signal is provided to TIUA 880 via the bus indicated TDMFS.

Figure 7:
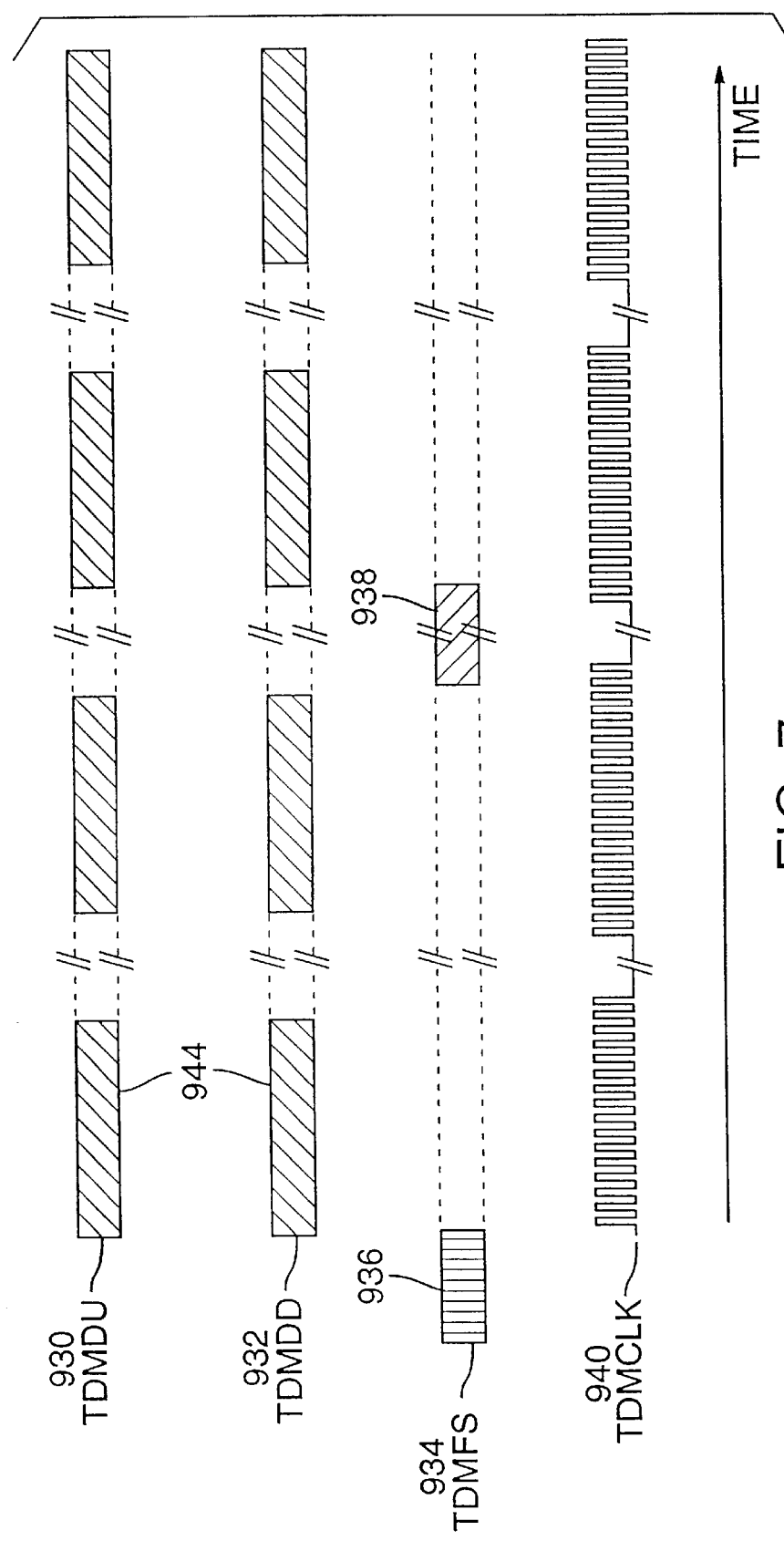
FIG. 7 shows the TDM interface signals between the broadband network unit common control and the UVG cards.

This signal provides synchronization between TIUA 880 for communication on the up and down buses. This signal has a code for frame sync and a different code for superframe sync. In FIG. 7 the downstream frame sync is indicated by reference character 936. The superframe will occur every eight frames. In FIG. 7 the superframe sync is indicated by reference character 938. This signal is in the high state when not transmitting a frame sync code. The frame sync code is ($EA) which is 11101010, and the superframe code is ($CC) which is 1100. As used herein, $ indicates hexadecimal. When a correct frame code is received the next bit after the last bit of the frame code is taken as the first bit of the next frame. Although in FIG. 7 the upstream and downstream words are illustrated as being in sync, the upstream and downstream data can be out of sync, through use of the offset parameter in the TIUA. The offset dictates the number of clock cycles that the upstream is late.

The ability to have a timing offset with bit resolution between the upstream and downstream frames offers several advantages in both minimizing transmission delay of voice signals as well as reducing the amount of memory needed to store frames of information. By being able to provide a bit-wide offset, it is possible to access information as soon as it arrives without buffering an entire frame.

The ability to create bit resolution to decrease delays in other portions of the system including the DSLAC™ devices can be accomplished by placing a byte wide register in TIUA 880 which can be programmed for a delay corresponding to an integer number of clock cycles, providing in essence a fine timing control which can be used in conjunction with the byte timing control found in commercially available DSLACs.

Common Control Interface

The BNUCC 800 is connected with TIUA 880 through a serial TDM bus. This bus is designed to support a maximum of six POTS interfaces. The BNU serial TDM bus consists of a common 4.096 MHz clock provided over TDMCLK, a common 125-us frame sync provided over TDMFS, an individual upstream TDM data provided over TDMDU and an individual downstream TDM data provided over TDMDD.

Referring to FIG. 8, the frame sync marks the first bit of a frame (the MSB of the first timeslot). Each frame consists of 64 DS0's (or timeslots) and grouped into 32 channels (2 DS0's per channel). The first DS0 in a channel is the PCM TDM data and the second DS0 is its associated bit-orienting signaling. The first channel (#00) is reserved for the frame OH and the last channel (#31) is reserved for the control.

The OH channel is used to monitor the performance of the link. The second DS0 (sig DS0) is used for the bus parity checking. It contains the result of a cumulative XOR for each byte in the frame. The first byte is inverted which is equivalent to starting with all ones instead of all zeroes.

There are two control timeslots: CTL #1 and CTL #2. CTL #1 DS0 (@ channel #31 data DS0) is used to perform slow access protocol to the TIUA hardware. CTL #2 DS0 (@ channel #31 sig DS0) is reserved except for the top two MSbs. The MSb indicates if an upstream parity error has occurred. It is a one if an error occurred last frame. The second MSb indicates an AIS error when high(on-one). The third MSb indicates an Power error when high(on-one). This will be put in a register for the local processor to read along with the upstream parity error. The upstream data carries just the message and the Parity Error bit.

The CTL1 channel uses the 1-ms superframe dimension to create two 4-byte messages per superframe for a simple control/response protocol between BNUCC 800 & TIU.

Referring to FIG. 8, a single frame, indicated by reference character 931, is illustrated. Also illustrated is the downstream data channel TDMDD indicated by reference character 932, the sync channel TDMFS denoted 934 and the clock (TDMCLK) at 940. Within frame 931, there is included, as mentioned above, channel 31 which includes two control time slots, CTL #1 and CTL #2 indicated in FIG. 8 by reference characters 960 and 962. Frame 931 includes channels 0 to 31, in FIG. 8 channel 0 being indicated by reference characters 950 and 952. Similarly, channel 1 is indicated by reference characters 954 and 956. Referring to FIG. 9A, channel #31 downstream is illustrated, and it will be appreciated that DS0-1 may be used for a multi-frame message for providing control signals to TIUA 880. Similarly, referring to FIG. 9B, channel 31 is also used for a multi-frame message in the upstream direction.

The format for an up-stream control message is illustrated in FIG. 9C. As used herein, the eight frames illustrated in FIG. 9C are referred to as a superframe. An example of commands and addresses for upstream and downstream messaging is illustrated in FIG. 9D.

An advantage of the commands and addresses for upstream and downstream messaging is that they can be implemented in a software based line card in which a microprocessor and external memory are present, but are designed such that a simple hardware based machine (e.g. TIUA 880) can be used. This is accomplished by using short codes, as illustrated in FIG. 9D. Elimination of the microprocessor and associated memory would have obvious cost advantages.

In a preferred embodiment, downstream messages contain a command byte to indicate the action to be taken, and upstream replies are generated using the downstream command byte plus the hexadecimal value of $80. Upstream messages which do not require data to be transmitted from the card repeat the data sent in the downstream to allow BNUCC 800 to confirm that the messages were properly received.

II. Universal Voice Grade Card Initialization

A. Universal Voice Grade initialization overview

Figure 10:
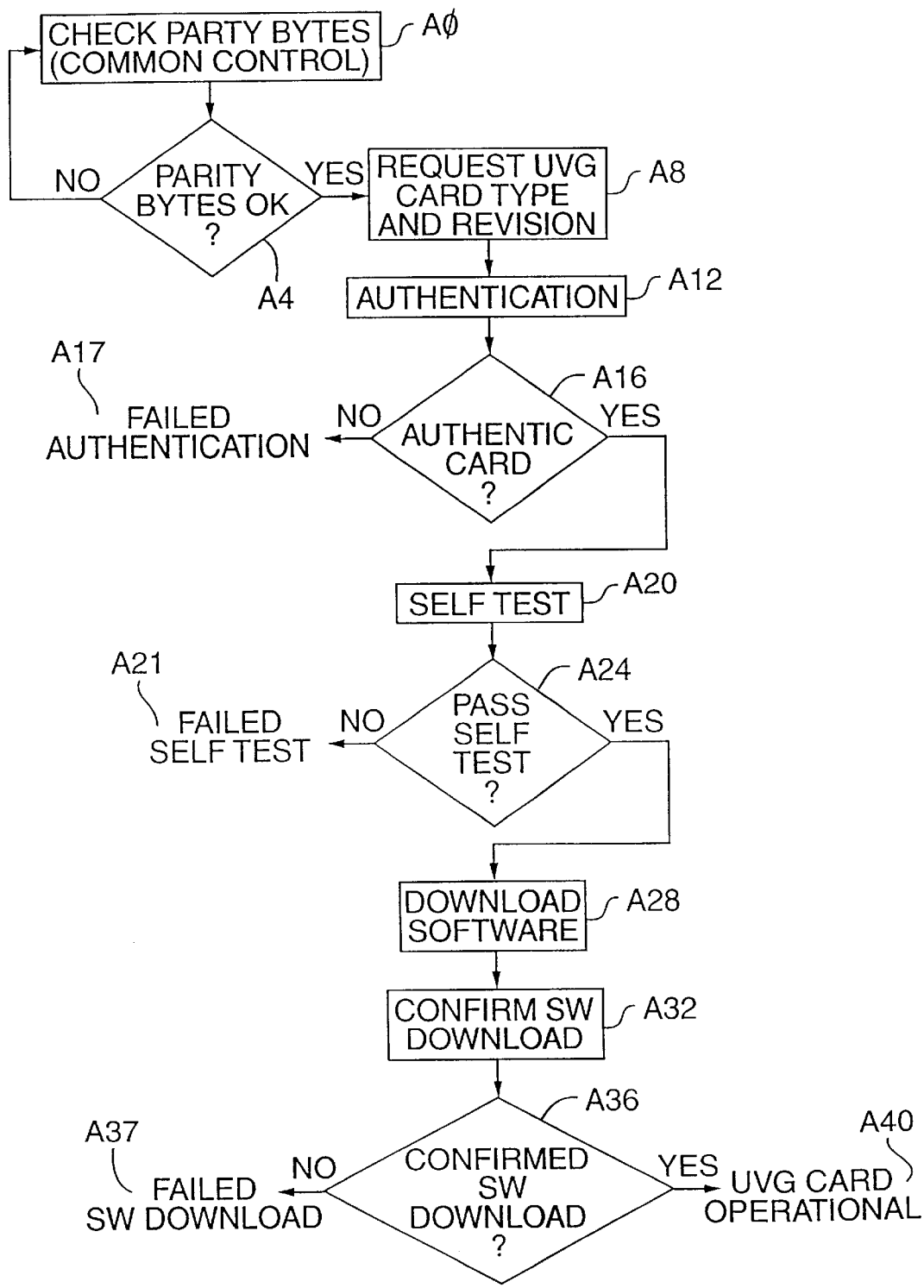
FIG. 10 shows a procedure for initializing, authenticating and testing a UVG card.

The basic operation of the UVG card 140 can be understood from FIG. 10, which illustrates the steps which can occur when a UVG card 140 is installed in BNU 110A. Upon installation, the a check parity bytes step A0 is performed on signals coming from the UVG card 140. A parity byte test A4 is performed by BNUCC 800 to determine if the parity bytes are correct. The parity byte is calculated through a cumulative xor for each byte in the frame. The first byte is inverted which is equivalent to starting with all ones instead of all zeros. An example of this is if in a given frame all the bytes in the frame are zero except for the parity for the previous frame, the parity for this frame will be the parity of the previous frame inverted. This means that if the given parity was (10011001) the new parity would be (01100110). To further describe this process a list of the calculated parity versus data in a frame is shown below. (All values are in hexadecimal and the frame is assumed to start at the first data value.)

Data :01:10:FF:AA.

Parity :FE:EE:11:BB.

If correct, card identification A8 takes place, by requesting the UVG card 140 type and revision which is typically stored in EEPROM 886. In the event that the parity byte test A4 is failed another iteration of check parity bytes A0 will be performed, since it may be the case that the UVG card 140 has not been inserted in the BNU 110 yet, or has not been powered up.

After card identification A8 an authentication step may occur, whereby a cryptographic key or function is utilized to generate a signature for the card which identifies the card as an authentic product which is known to meet the required reliability and quality standards. The authentication A8 occurs local to the UVG card 140.

The results of the authentication A8 are transmitted to the BNUCC 800 and may also be transmitted to the BDT 100. An authentic card test A16 is performed to determine if the results of the authentication A8 are correct, which effectively amounts to the checking of the signature of the card. The BNUCC 800 or the BDT 100 may determine in the authentic card test A16 that the card has failed authentication A17, or if the card is determined to be authentic the system will move to card self-test A20.

Card self-test A20 may involve the downloading of a self-test seed from the BNUCC 800 or BDT 100 to the TIUA 880 which begins a self-test procedure to insure the integrity of the circuitry, the connections to the printed circuit board of the UVG card 140, and the functionality of some or all of the circuitry and components on UVG card 140.

Subsequent to the self-test A20, a self-test pass test A24 is performed in either the BNUCC 800 or the BDT 100. This test may be as simple as comparing a short test result of a few bytes with an expected test result which is stored in the BNUCC 800 or the BDT 100, or comparison of a long sequence of several hundred bytes generated by the self-test with a long stored sequence. In any embodiment, the end result will be a determination that the UVG card is or is not working properly. In the event that the card is not working properly it is considered to have failed self-test A20. If the card has been determined to be working properly it will advance to download software A28.

After plug-in, power-on, or reset, UVG card 140 will have sufficient function to interpret the following datalink messages: Read Memory, Write Memory, Start, Set Upstream Offset, Unlock, and Reset. Table 6A below sets forth the datalink function codes.

TABLE 6A

Datalink Function Codes

| | | |
|---|---|---|
| #define cD1FuncNil | 0 | /* Nil function */ |
| #define cD1FuncRead | 1 | /* Read memory */ |
| #define cD1FuncWrite | 2 | /* Write memory */ |
| #define cD1FuncOffset | 3 | /* Set upstream offset */ |
| #define cD1FuncGo | 4 | /* Run loaded code */ |
| #define cD1FuncTestLpbk | 0x22 | /* Test loopback */ |
| #define cD1FuncUnlock | 0x55 | /* Unlock message interface */ |
| #define cD1UnlockAddr | 0x1234 | /* Address value for unlock */ |
| #define cD1UnlockData | 0x77 | /* Data value for unlock */ |
| #define cD1FuncReset | 0x69 | /* Command for reset */ |
| #define cD1ResetAddr | 0x5ab3 | /* Address value for reset */ |
| #define cD1ResetData | 0x96 | /* Data value for reset */ |
| #define cD1ReplyBit | 0x80 | /* Attach this bit to indicate r |
| #if 0 | | |
| #define cTiuLoadAddr | 0x1600 | /* Where TIU downloaded code goes */ |
| #else | | |

TABLE 6A-continued

Datalink Function Codes

| | | |
|---|---|---|
| #define cTiuLoadAddr | 0x2000 | /* Where TIU downloaded code goes */ |
| #endif | | |

In a microcontroller/software mechanization as described herein, this function is implemented by software loaded at the time of manufacture, into a non-volatile memory (e.g. one-time programmable ROM) in microcontroller chip 884, and by hardware (fixed logic or programmable from an on-board non-volatile memory). In a hardware mechanization, this would be provided by fixed logic, or by programmable logic loaded from an on-board non-volatile memory.

After plug-in, power-on, or reset, the datalink to the UVG card disables all functions with the exception of Reset and Unlock. This guards against false datalink actions during insertion and startup transient conditions. UVG card 140 includes a non-volatile identification memory U19 accessible via registers mapped into the address space accessible via the datalink to the UVG card. The current mechanization maps the serial access pins (chip select, serial clock, serial input, and serial output) of the memory device U19 directly into bits in TIUA 880 registers; TIUA registers (address range $8xxx) are accessible via the UVG and datalink Read Memory and Write Memory functions.

BNUCC 800 provides a UVG card activity detector, which detects transitions on the upstream TDM bus (TDMDU) separately for each UVG card slot in the BNU.

When BNUCC 800 software observes a sufficient period of activity on a UVG card upstream bus, it assumes a UVG card is present, and begins supervision of the card.

BNUCC 800 software sends an Unlock message on the datalink. This provides a distinctive pattern (1 in 2^32 probability of false indication assuming random content in all message fields) which instructs the UVG card to allow all subsequent datalink operation types.

BNUCC software sends a Set Upstream Offset message on the datalink. This allows the UVG card to set its upstream PCM bus offset, which is necessary for upstream UVG card datalink messaging to function properly.

BNUCC 800 software reads the identification of the UVG card, via the above described datalink access to the serial identification memory U19.

BNUCC 800 software may either interpret the UVG card identification and authentication directly, or may forward these responsibilities to the BDT 100, or the effort may be duplicated or combined between BNUCC 800 and BDT 100.

BNUCC 800 or BDT software selects an appropriate image of software, or of programmable state machine control, for the specific type and revision of UVG card hardware indicated and retrieves in the above step in which the UVG card identification memory U19 was read.

BNUCC 800 obtains this image, either from its own non-volatile memory, or piecewise from its communication link with the BDT 100, and sends this image byte-by-byte to the UVG card, using Write Memory commands on the UVG card datalink.

Integrity of receipt of the image by UVG card may be verified by observing the Write Memory reply messages returned by the UVG card, and comparing these with the expected sequence of addresses. This step provides an early and rapid indication of gross failures in the UVG card microcontroller or hardware.

Integrity of receipt of the image by the UVG card may be further verified by performing a sequence of Read Memory messages to the card, observing the returned responses, and comparing them to the values at each address in the image. This step can provide an indication of failures in UVG card memory—particularly addressing failures.

BNUCC 800 software sends a Start message to the UVG card. For the microcontroller mechanization described herein, the address field of the Start message contains an address for the UVG card microcontroller to jump to, to start the downloaded software. For a state machine implementation, this might contain a starting state machine code or address. BNUCC 800 software sends an Unlock message. This unlock the datalink for the running software or state machine. BNUCC 800 software sends a Set Upstream Offset message. This sets the upstream offset for the running software or state machine. BNUCC 800 software sends per-board and per-line provisioning information, using Write Memory datalink commands to the pseudo-registers area located in range $9xxx. BNUCC 800 software sets per-line force-state controls in the provisioning information by the above described mechanism, to set each line's state machine running in the appropriate initial state. Upon receiving provisioning or service state changes from BDT 100, BNUCC 800 software may from time to time set the per-line force-state controls to force line states to new values (states suitable for out-of-service, or in-service conditions).

B. Universal Voice Grade card authentication

Card authentication A16 of the UVG card 140 may be based on one or several of many well known encryption techniques. In utilizing these encryption techniques, a secret key is stored in the UVG card 140, and typically within the TIUA 880. Upon requesting authentication by the BDT 100 or the BNUCC 800, the secret key is used to compute a signature, either by using a mathematical one-way function whose inverse is difficult to copy, or by using a initialization key generated by the BDT 100 or BNUCC 800. The signature may be calculated within the TIUA 880, the microcontroller 884, or a combination of these devices. The signature is the result which is sent to the BDT 100 or BNUCC 800 for the authentic card test A16.

Cryptographic techniques have been researched extensively and are well understood by those skilled in the art. The article by James L. Massey entitled "An Introduction to Contemporary Cryptology," and published in the Proceedings of the IEEE, vol. 76, no. 5, May 1988, describes a number of cryptographic techniques, as does Federal Information Processing Standards Publication 186, Digital Signature Standard (DSS). The following US patents also describe cryptographic techniques: U.S. Pat. No. 5,231,668 by Kravitz entitled "Digital Signature Algorithm"; U.S. Pat. No. 4,200,770 by Hellman et. al. entitled "Cryptographic Apparatus and Method," issued on Apr. 29, 1980; U.S. Pat. No. 4,218,582 by Hellman et al. entitled "Public Key Cryptographic Apparatus and Method," issued on Aug. 19, 1980; U.S. Pat. No. 4,405,829 by Rivest et al., entitled "Cryptographic Communications System and Method," issued on Sep. 20, 1983; and U.S. Pat. No. 4,424,414 by Hellman et al., entitled "Exponentiation Cryptographic Apparatus and Method," issued on Jan. 3, 1984. The aforementioned article and US patents are all incorporated herein by reference.

Although the key within the UVG card 140 may be a stored secret key or a secret key sent through a secure means, the key may actually be the result of a self-test or secret function contained within TIUA 880. In this case cryptographic methods may be used to calculate and transmit a signature to the BNUCC 800 or BDT 100, but originate as part of the card self-test A20.

The authentication is not limited to one particular embodiment, but can be a combination of the self-test and a cryptographic technique. Similarly, the card self-test A20 can be considered to be card authentication AI2 when the self-test includes a function which serves as a key. In this alternate embodiment, the authentication A12 and card self-test A20 steps shown in FIG. 10 are combined, as are the authentic card test A16 and the self-test pass test A20. Failure to pass either one of these combined test results in a state which is the combination of failed authentication A17 and failed self-test A21.

C. Universal Voice Grade card test

1. Ring Generator Test

Because the ring generator 890 is a critical component of the UVG card 140 an individual test to determine that it is operating properly can be performed. In one embodiment of the ring generator test a constant duty-cycle pulse train is applied as the digital pulse train signal 892, with the result being a constant dc-voltage output as the ringing voltage signal 896. In this embodiment at least two different constant duty-cycle pulse trains, generated by circuitry in the TIUA 880 are applied to the ring generator 890, with the result being two distinct DC voltages which appear as the ringing voltage signal 896. Test circuitry in the BNUCC800 looks for these two DC voltage levels. This test can thus be used to verify that the ring generator is functioning correctly. Test circuitry for measuring DC voltage levels is well understood by those skilled in the art.

Alternatively, the tested variable may be the frequency of the ringing instead of the voltage amplitude. This method has several advantages. The hardware for this test type is kept to the current circuit which is simple and fits on the common control card already. The change in the TIUA is simpler than the changing amplitude method. To support this type of testing the TIUA will have ring frequency programmability. The generator will be able to switch from 20 Hz to other frequencies. The Common Control software will be able to confirm that the predetermined sequence of frequencies is being followed, or that the TIUA responds correctly to frequency commands. The ring generator will be tested for correctly generating various frequencies and potentially different pulse widths. If the ring generator circuit is functioning correctly it will be able to generate all of the expected frequencies.

2. TIUA Self-test

The following method provides in-system testing for valid and operational UVG cards. The basic concept for this scheme is for BDT 100 to send a datalink message to BNUCC 800 which includes a seed value. The BNUCC 800 then sends this seed to, for example, line card 140A. The seed is used along with a built in seed as the starting point of a linear feedback shift register (LFSR). The output of the LFSR will then fill a subset of the TIUA scan chain. The subset is chosen to avoid conflicts with the BNUCC800 communications and line service functionality. The chosen subset circuit is clocked N times to generate a next state of the circuit. This next state is then sent upstream in its entirety to BNUCC 800 via the message portion of the BNUCC800-line card interface. The BNUCC 800 in turn sends this data upstream to BDT 100 via the datalink. The step where the TIUA 880 generates internal next states based on the LFSR can be repeated a number of times to generate a sufficiently long data stream from TIUA 880 to provide acceptable coverage.

The method used by BDT 100 to check the data stream generated in this fashion is flexible. It can consist of actually checking the entire bit stream or a nonlinear transform of the data against a lookup table held in memory. This method allows for the verification table to be updated and or expanded at any time during the life of the product since it is held in software, and the LFSR in the TIUA along with the logic is entirely deterministic.

D. State machine description, operation and downloading
State machine description and operation The state machine on each UVG line card provides control functionality for each of the subscriber circuits 812 on UVG card 140. As pointed out above, the state machine for a line card may be implemented using internal state machine 604 in TIUA 880, or by the combination of ip interface 605 and microcontroller 884 (FIG. 3). The state machine on a given UVG card 140 can control six subscriber circuits, as realized in three dual line UVG circuits 812. The state machine interprets signaling coming from the PSTN switch 10 and controls the subscriber circuit to provide for ringing, and monitors the subscriber line via the tip lead 266 and ring lead 268 to determine when the telephone 185 is on-hook and off-hook. The state machine uses information from the PSTN switch 10 along with the telephone 185 status to configure the subscriber circuit appropriately for each state and to transition from one state to another.

Figure 11:
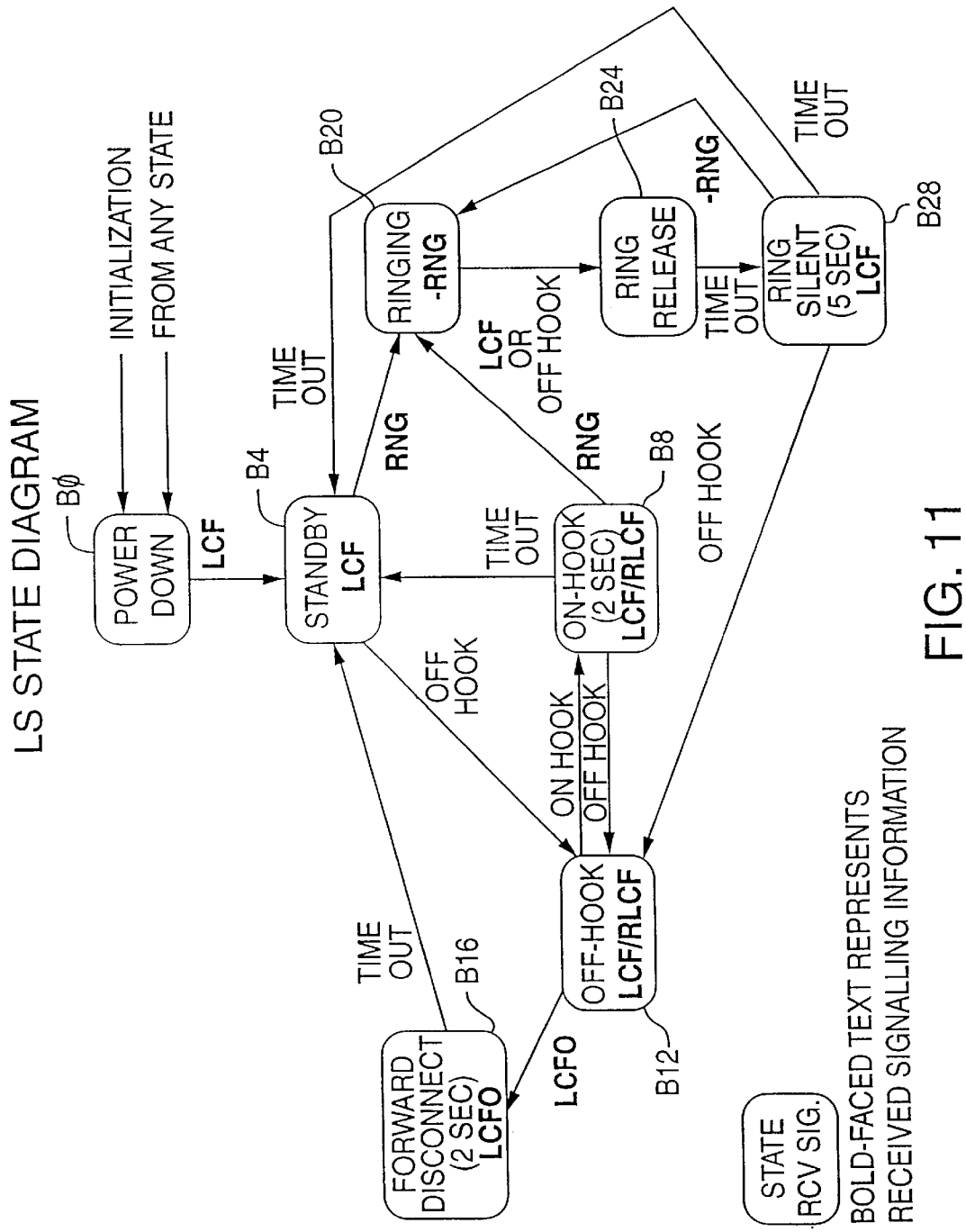
FIG. 11 shows a loop start state diagram for a UVG card such as that illustrated in FIG. 3.

FIG. 11 illustrates the various states which are utilized in a loop-start UVG circuit, in which signaling is indicated by the closing of the subscriber loop through the formation of a closed circuit between, for example, tip lead 266A and the ring lead 268A. In FIGS. 11 and 12, the text in all capital letters in the states indicates received signalling information. FIG. 12 illustrates the states which are utilized in a ground-start UVG circuit, in which a ground is applied to the tip lead 266A or ring lead 268A as a signaling method. In FIG. 12, the dashed lines represent ground start mode information.

Referring to FIG. 12, the power down state B0 is the initial state when the subscriber circuit has been set in power down mode by the microcontroller 884. This state may be the result of the subscriber circuit not having been provisioned or activated yet, or a fault or power supply problem in the BNU 110.

The ground start idle state B1 occurs only when the subscriber circuit is a ground-start circuit, and is the default state when the circuit is operational but there is no activity on the subscriber line, which corresponds to no ringing and the handset of telephone 185 being on-hook.

The ring ground state B6 occurs only when the subscriber circuit is a ground-start circuit, and corresponds to the ring lead 268 being grounded. This state reflects the fact that the subscriber is requesting dial tone to place a call.

The stand-by state B4 is the nominal state for loop-start circuits when the telephone 185 is on-hook and not ringing.

The off-hook state B12 occurs when the handset of the telephone 185 is in the off-hook position, due to the fact that the subscriber is initiating a call, or because a call has arrived as indicated by ringing, and the subscriber has answered the call.

The forward disconnect state B16 typically indicates that the other party in a communication has hung-up by placing the handset of that party's telephone on-hook. The forward disconnect signal is particularly useful for answering machines, modems, and fax machines since it indicates to that equipment that the communication has finished.

The on-hook state B8 occurs when the subscriber has returned the handset of the telephone to the on-hook position, but before the subscriber circuit is placed in stand-by state B4. The on-hook state may also occur as part of pulse dialing, in which the dial pulses are formed by on-hook signals from the telephone 185 dial circuit. Similarly, a flash-hook signal is communicated to the PSTN switch 10 via the on-hook state.

In the ringing state B20 the ringing voltage 896 is being applied to the line via the solid state relay 910, causing the telephone 185 to ring.

The ring release state B24 occurs when the line has been in a ringing state B20, and is being signaled to remove the ringing voltage 896. This may be because a ring trip has occurred (indicating that the calling party has answered the line), there is an off period in the ringing sequence corresponding to the normal cadenced ringing, or a system fault has occurred which has caused the system to intervene to remove ringing to avoid being in a constant ringing mode. The ring release state B24 also provides a 25 ms period (½ of a ring cycle) during which time the ringing voltage 896 remains removed by the solid state relay 910. The SLIC 906 can be reconnected to the subscriber circuit by the solid state relay subsequent to this 25 ms period in the ring release state B24.

The ring silent state B28 represents the silent period between ring signals. Typically the ring cadence is 2 seconds on and 4 seconds off. If the subscriber circuit is in the ring silent state for more than 5 seconds it is assumed that the calling party has hung-up and that for loop-start circuits the subscriber circuit should return to the stand-by state B4. For ground-start circuits the system will return to the ground-start idle state B1.

The circuit state variables and the signaling they provide are defined in Table 7. From this table it can be seen that signaling is generated in the upstream direction (to the PSTN switch 10) and control signals to control the solid state relays implemented by LCAS A (910A) and LCAS B (910B), ring generator 890, DSLAC™ device 900A/B, and SLIC circuits 906A and 906B. Tables 7–17 provide detailed descriptions of the state variable, condition, and value for each of the state variable for each of the states shown in FIGS. 11 and 12. Table 18 gives the state transition signaling conditions and the transitions which take place.

The state machine is completely downloadable from BNUCC 800.

TABLE 7

Circuit state variables and definitions

| Circuit State Variable | Definition |
|---|---|
| UPSIG | Upstream ABCD signaling message that the line circuit should be sending |
| SLIC Bits | State that the SLIC should/may be set to for this state. |
| Batt Select | State of the battery (i.e. On-hook or Off-hook battery) |
| LCAS Bits | State that the LCAS control bits should be set to for this state. |

TABLE 7-continued

Circuit state variables and definitions

| Circuit State Variable | Definition |
|---|---|
| RING_EN | State of the Ring Generator enable lead (low true enable) |
| BUSY LED | State of the BUSY LED (high/low true not defined yet) |
| DSLAC™ device | Power Up/Down: Command sent over serial bus |
| DNSIG (Valid) | Valid downstream ABCD signaling messages that the line circuit may receive |
| IDET | Expected indication on IDET lead from SLIC. [e.g. On-Hook/Off-Hook] |

TABLE 8

Power Down or Unequipped state description

| State Variable | Condition | Value |
|---|---|---|
| UPSIG | Loop Open | [ABCD = 0101] |
| SLIC Bits | OPEN CIRCUIT | [C3C2C1 = 000] |
| Batt Select | −48 V | [B2EN = 1] |
| LCAS Bits | Idle | [TESTIN = 0, TESTOUT = 0, RING = 0,] |
| RING_EN | OFF | [RNG_EN* = 1] |
| BUSY LED | OFF | |
| DSLAC™ device | Power Down | [Serial Data Link command] |
| DNSIG (Valid) | Don't Care | |
| IDET | Ignore | |

TABLE 9

GS Idle state description

| State Variable | Condition | Value |
|---|---|---|
| UPSIG | Loop Open | [ABCD = 0101] |
| SLIC BITS | Tip Open | [C3C2C1 = 1001] |
| Batt Select | −48 V | [B2EN = 1] |
| LCAS Bits | Idle | [TESTIN = 0, TESTOUT = 0, RING = 0] |
| RING_EN | OFF | [RNG EN* = 1] |
| BUSY LED | OFF | |
| DSLAC™ device | Power Down | [Serial Data Link command] |
| DNSIG (Valid) | LCFO, LCE, RNG | |
| IDET | No Ring Ground | |

TABLE 10

Ring Ground state description

| State Variable | Condition | Value |
|---|---|---|
| UPSIG | Ring Ground | [ABCD = 0000] |
| SLIC BITS | Tip Open | [C3C2C1 = 100] |
| Batt Select | −48 V | [B2EN = 1] |
| LCAS Bits | Idle | [TESTIN = 0, TESTOUT = 0, RING = 0] |
| RING_EN | OFF | [RNG_EN* = 1] |
| BUSY LED | ON | |
| DSLAC™ device | Power Down | [Serial Data Link command] |

TABLE 10-continued

Ring Ground state description

| State Variable | Condition | Value |
|---|---|---|
| DNSIG (Valid) | LCFO, LCF | |
| IDET | Ring Ground | |

TABLE 11

Stand-By

| State Variable | Condition | Value |
|---|---|---|
| UPSIG | Loop Open | [ABCD = 0101] |
| SLIC BITS | StandBy | [C3C2C1 = 101] |
| Batt Select | −48 V | [B2EN = 1] |
| LCAS Bits | Idle | [TESTIN = 0, TESTOUT = 0, RING = 0] |
| RING_EN | OFF | RNG_EN* = 1] |
| BUSY LED | OFF | |
| DSLAC™ device | Power Down[1] | [Serial Data Link command] |
| DNSIG (Valid) | LCFO, LCF, RNG | {LCFO only for GS lines} |
| IDET | On-Hook | |

[1]If the line is provisioned for full-time on-hook transmission, then the DSLAC™ device must be in the power up mode in the Stand-By state.

TABLE 12

Off-Hook [Conversation] state description

| State Variable | Condition | Value |
|---|---|---|
| UPSIG | Loop Closed | [ABCD = 1111] |
| SLIC BITS | ACTIVE/REVERSE | [C3C2C1 = 010/110] |
| Batt Select | −24 V | [B2EN = 0] |
| LCAS Bits | Idle | [TESTIN = 0, TESTOUT = 0, RING = 0] |
| RING_EN | OFF | [RNG EN* = 1] |
| BUSY LED | ON | |
| DSLAC™ device | Power Up | [Serial Data Link command] |
| DNSIG (Valid) | LCFO, LCF, RLCF | |
| IDET | Off-Hook | |

TABLE 13

On-Hook state description

| State Variable | Condition | Value |
|---|---|---|
| UPSIG | Loop Open | [ABCD = 0101] |
| SLIC BITS | Active/Reverse | [C3C2C1 = 010/110] |
| Batt Select | −24 V | [B2EN = 0] |
| LCAS Bits | Idle | [TESTIN = 0, TESTOUT = 0, RING = 0] |
| RING_EN | OFF | [RNG_EN* = 1] |
| BUSY LED | OFF | |
| DSLAC™ device | Power Up | [Serial Data Link command] |
| DNSIG (Valid) | LCFO, LCF, RLCF | |
| IDET | On-Hook | |

TABLE 14

Forward Disconnect state description

| State Variable | Condition | Value |
|---|---|---|
| UPSIG | Loop Closed | [ABCD = 1111] |
| SLIC BITS | TIP OPEN | [C3C2C1 = 100] |
| Batt Select | −48 V | [B2EN = 1] |
| LCAS Bits | Idle | [TESTIN = 0, TESTOUT = 0, RING = 0] |
| RING_EN | OFF | [RNG_EN* = 1] |
| BUSY LED | OFF | |
| DSLAC™ device | Power Up | [Serial Data Link command] |
| DNSIG (Valid) | LCFO, LCF | |
| IDET | ON-Hook | The UPSIG bits must indicate loop closed, even though the line shall be indicating an on-hook condition |

TABLE 15

Ringing state description

| State Variable | Condition | Value |
|---|---|---|
| UPSIG | Loop Open | [ABCD = 0101] |
| SLIC BITS | Ringing | [C3C2C1 = 001] |
| Batt Select | −48 V | [B2EN = 1] |
| LCAS Bits | Ringing | [TESTIN = 0, TESTOUT = 0, RING = 1] |
| RING_EN | ON | [RNG_EN* = 0] |
| BUSY LED | OFF | |
| DSLAC™ device | Power Down | [Serial Data Link command] |
| DNSIG (Valid) | LCFO, LCF, RNG | |
| IDET | On-Hook | |

TABLE 16

Ringing Release state description

| State Variable | Condition | Value |
|---|---|---|
| UPSIG | Loop Open | [ABCD = 0101] |
| SLIC BITS | ACTIVE | [C3C2C1 = 010] |
| Batt Select | −24 V | [B2EN = 0] |
| LCAS Bits | All Off | [TESTIN = 0, TESTOUT = 1, RING = 1] |
| RING_EN | ON | [RNG_EN* = 0] |
| BUSY LED | ON/OFF | On or Off, depending upon UPSIG condition |
| DSLAC™ device | Power Down | [Serial Data Link command] |
| DNSIG (Valid) | LCFO, LCF, RNG | RNG would be received only during a ring trip |
| IDET | On-Hook/Ignore | |

TABLE 17

Ringing Silent state description

| State Variable | Condition | Value |
|---|---|---|
| UPSIG | Loop Open | [ABCD = 0101] |
| SLIC BITS | ACTIVE | [C3C2C1 = 010] |
| Batt Select | −24 V | [B2EN = 0] |

TABLE 17-continued

Ringing Silent state description

| State Variable | Condition | Value |
|---|---|---|
| LCAS Bits | Idle | [TESTIN = 0, TESTOUT = 0, RING = 0] |
| RING_EN | ON | [RNG_EN* = 0] |
| BUSY LED | OFF | |
| DSLAC™ device | Power Down/Up[1] | [Serial Data Link command] |
| DNSIG (Valid) | LCFO, LCF, RNG | |
| IDET | On-Hook[2] | |

[1]If the line is provisioned for on-hook transmission, then the DSLAC™ device must be in the power up mode in the Ring Silent state.
[2]Even if the line left the Ringing state because of a ring trip, the conditions imposed by the circuit during the Ring Release state may result in the IDET lead providing an on-hook indication when it enters the Ring Silent state. In the case of a ring trip, this indication shall change to Off-Hook in a short period of time.

TABLE 18

State transition signaling conditions and transitions

| State | Transition Signaling Condition | Transition |
|---|---|---|
| power down or unequipped | DNSIG = LCF | Next State = Idle |
| | DNSIG = LCFO | Next State = GS Idle |
| GS idle | IDET = Ring Ground | Next State = Ring Ground |
| | DNSIG = LCFO | No change; Remain in GS Idle |
| | DNSIG = RNG | Next State = Ringing |
| | DNSIG = LCF | Next State = Stand-By (This usually will be followed by a ringing code) |
| ring ground | IDET – Ring Ground | Remain in Ring Ground |
| | IDET = No Ring Gnd | Return to GS Idle. Assumes an abort of the call in progress |
| | DNSIG = LCF | Next State = Off-Hook |
| stand-by | IDET = Off-Hook | Next State = Off-Hook |
| | DNSIG = LCF | Remain in Stand-By |
| | DNSIG = RNG | Next State – Ringing |
| | DNSIG = RLCF | Ignore |
| | DNSIG = LCFO | Next State = GS Idle [GS lines only; Ignore for LS line] |
| off-hook [conversation] | IDET = Off-Hook | Remain in current state |
| | IDET = On-Hook | Next State – On-Hook |
| | DNSIG = LCF | Put SLIC in ACTIVE mode; remain in current state |
| | DNSIG = RNG | Ignore |
| | DNSIG = RLCF | Put SLIC in REVERSE ACTIVE mode; remain in current state. |
| | DNSIG = LCFO | Next Sate = Forward Disconnect |
| on-hook | IDET = On-Hook | Remain in current state |
| | IDET = Off-Hook | Next State = Off-Hook |
| | DNSIG = LCF | Put SLIC in ACTIVE mode; remain in current state |
| | DNSIG = RNG | Next State = Ringing |
| | DNSIG = RCLE | Put SLIC in REVERSE ACTIVE mode; remain in current state. |
| | DNSIG = LCFO | Next State = GS Idle [GS Lines only; Ignore this for LS lines] |
| | 2 second TimeOut | Next State = Stand-By |
| forward disconnect | DNSIG = LCF | Next State = Stand-By |
| | DNSIG = RNG | Ignore |
| | DNSIG = RLCF | Ignore |
| | DNSIG = LCFO | Remain in Current State |
| | 2 second TimeOut | Next State = Stand-By [LS line] Next State = GS Idle [GS Line] |
| ringing | DNSIG = RNG | Remain in current state |
| | IDET = On-Hook | Remain in current state |
| | IDET = Off-Hook | Next State = Ring Release |
| | DNSIG = LCF | Next State = Ring Release |
| | DNSIG = RLCF | Ignore |
| | DNSIG = LCFO | Next State = Ring Release |
| ring release | IDET | Ignore IDET in this state |
| | DNSIG | Ignore DNSIG in this state |
| | TimeOut | Next State = Ring Silent |
| ring silent | IDET = On-Hook | Remain in current state |
| | IDET = Off-Hook | Next State = Off-Hook |
| | DNSIG = LCF | Remain in current state |
| | DNSIG = LCFO | Next State = GS Idle |
| | DNSIG = RNG | Next State = Ringing |
| | 5 Second TimeOut | Next State = Stand-By |

E. Two-layer State Machine

In one embodiment of the present invention, the state machine is divided into two layers: a signalling preprocessing layer, and a main control layer. The two layers are effectively independent state machines, coupled by minimal information; the signalling preprocessing layer accepts TR-303 signalling from the digital transmission facility at a 3 ms interval, and sends a conditioned and augmented TR-NWT-000303 signalling code to the main control layer. The augmentation of the TR-NWT-000303 signalling code includes an additional code state to indicate the onset of trunk conditioning (response to transmission facility failure).

The signalling pre-processing state machine 2001 (FIG. 20) conditions incoming telephony signalling states, furnishes this conditioned signalling to the main state machine, and maintains a set of per-line alarm conditions. The alarm conditions may be retrieved as supplementary outputs from state machine 2001 to supervising equipment and systems. Conditioning and alarm processing of the signalling follow the requirements set down in Bellcore TR-NWT-000303 in combination with additional information from Bellcore specifications TR-NWT-00057, TR-TSY-000008 and TA-NWT-000909, all of which are incorporated herein by reference, each in its entirety.

Each line's associated signalling arrives, per TR-NWT-000303 standards, at an interval of 3 ms. The incoming signalling for a given line may be referred to as SigIn. Note that signalling processing for multiple lines per unit may be implemented in hardware by applying a single shared state machine control to input and output state information, which are connected to the control in a rotating succession of time intervals. The implementation disclosed herein is in software which, for execution time efficiency reasons, instantiates distinct code for each line, via a macro expansion which parameterizes common source code with the line number (e.g. variables named L1P.DSIG, L2P.DSIG et seq.). A hardware implementation could share the control logic at a succession of six 500 microsecond intervals, yielding a service interval of 3 ms per line.

Incoming signalling is mapped through the programmable function table SigInMap [SigIn] disclosed in Table 19 below to transform signalling codes invalid for the specific type of service, into other signalling codes such as an alarm indication signal (AIS). This mapped signal is referred to herein as DSIG (Downstream Signalling). In the following example for normal POTS service the output code nomenclature follows the decimal equivalent of the input code commentary along the ordinate of Table 19. In Table 19, as well as in other portions of the disclosure, the following acronyms have the indicated meanings: RLCF denotes reverse loop current feed; CFA denotes carrier fail alarm; CGA denotes carrier group alarm; DS0 denotes digital signal, level 0; LCF denotes loop current feed; and LCFO denotes loop current feed open.

TABLE 19

| SignInMap [ ] = | |
| --- | --- |
| 0, | /* 0000: -R ringing */ |
| 2, | /* 9001: undefined */ |
| 2, | /* 0010: DS0 AIS */ |
| 2, | /* 0011: undefined */ |
| 4, | /* 0100: RLCF */ |
| 5, | /* 0101: LCF */ |
| 2, | /* 0110: undefined */ |
| 7, | /* 0111: DS0 Yellow */ |
| 2, | /* 1000: reserved */ |
| 2, | /* 1001: reserved */ |
| 2, | /* 1010: undefined */ |
| 2, | /* 1011: undefined */ |
| 2, | /* 1100: undefined */ |
| 2, | /* 1101: reserved */ |
| 2, | /* 1110: undefined */ |
| 15 | /* 1111: LCF0 */ |

Pre-processing state machine 2001 maintains within each line's state information, a history buffer of the mapped signalling described above. This is maintained as a 5-stage shift-register, shifted once per 3 ms signalling interval. State machine 2001 has individual access to each stage of this buffer. These signals are referred to herein as DSM1 (Downstream Signalling Minus 1), DSM2, DSM3, DSM4, and DSM5. This signalling history is used to implement the storage requirements for signal freezing, unfreezing, and 4-intervals-valid and 2-intervals-valid confirmation described below.

The mapped signalling is also mapped a second time, through two programmable tables which each represent single-valued Boolean functions. These functions (SigThawable [SigIn] (Table 20 below) and SigThawableWithYellow [SigIn] (Table 21 below)) are furnished as inputs to pre-processing state machine 2001 to control unfreezing of signalling. In Tables 20 and 21, which illustrate signalling for normal POTS operation, 1 denotes TRUE.

TABLE 20

| SigThawable [ ] = | |
| --- | --- |
| 1, | /* 0000: -R ringing */ |
| 0, | /* 0001: undefined */ |
| 0, | /* 0010: DS0 AIS */ |
| 0, | /* 0011: undefined */ |
| 1, | /* 0100: RLCF */ |
| 1, | /* 0101: LCF */ |
| 0, | /* 0110: undefined */ |
| 0, | /* 0111: DS0 Yellow */ |
| 0, | /* 1000: reserved */ |
| 0, | /* 1001: reserved */ |
| 0, | /* 1010: undefined */ |
| 0, | /* 1011: undefined */ |
| 0, | /* 1100: undefined */ |
| 0, | /* 1101: reserved */ |
| 0, | /* 1110: undefined */ |
| 1 | /* 1111: LCFO */ |

TABLE 21

| SigThawableWithYellow [ ] | |
| --- | --- |
| 1, | /* 0000: -R ringing */ |
| 0, | /* 0001: undefined */ |
| 0, | /* 0010: DS0 AIS */ |
| 0, | /* 0011: undefined */ |
| 1, | /* 0100: RLCF */ |
| 1, | /* 0101: LCF */ |
| 0, | /* 0110: undefined */ |
| 1, | /* 0111: DS0 Yellow */ |
| 0, | /* 1000: reserved */ |
| 0, | /* 1001: reserved */ |
| 0, | /* 1010: undefined */ |
| 0, | /* 1011: undefined */ |
| 0, | /* 1100: undefined */ |
| 0, | /* 1101: reserved */ |
| 0, | /* 1110: undefined */ |
| 1 | /* 1111: LCFO */ |

Signalling pre-processing state machine 2001 maintains in each line's state information, a state register denoted PPState. The embodiment described herein requires 7 states. Signalling pre-processing state machine 2001 also maintains in each line's state information a timer (PPTimer) which can be set by the state machine output function, which decrements once every 3 ms (stopping after it decrements to zero), and which can be tested for zero/non-zero value by the state machine's control function. A single signal, InFacRed, applies across all lines, and indicates that the incoming transmission facility is unusable (in facility red alarm).

A complete set of transition-affecting inputs to signalling pre-processing state machine 2001, with respect to a given line, is: PPState, PPTimer, DSIG, DSM1, DSM2, DSM3, DSM4, DSM5, the two programmable Boolean function table results SigThawable [SigIn] and SigThawableWithYellow [SigIn], and the signal InFacRed, which applies equally to all lines. Reference character 2001 is used to denote a state machine which may be implemented as described above.

Figures 20, 21:
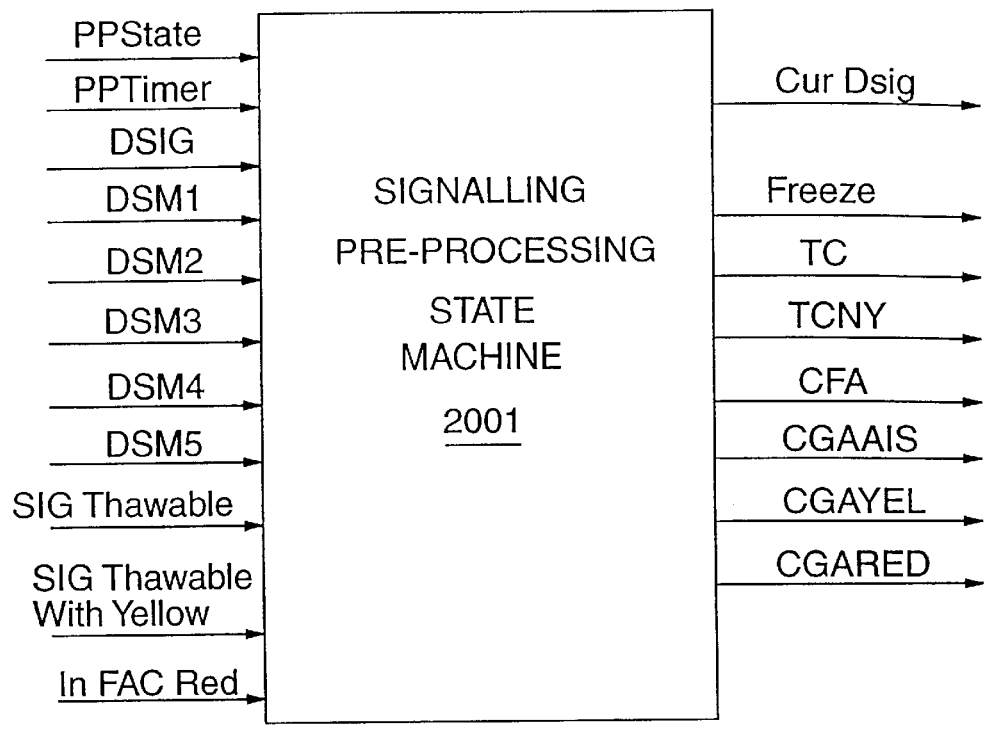
FIG. 20 illustrates the inputs and outputs of the signalling preprocessing state machine according to one embodiment of the present invention.
FIG. 21 illustrates a data structure for a state in the system disclosed.

Referring to FIG. 20, the first output of signalling pre-processing state machine 2001, with respect to a given line is the processed signalling, called CurDsig (current downstream signalling). This signalling consists of the ABCD signalling code set specified by TR-NWT-000303 for the given type of service, plus an additional state to indicate trunk conditioning. Trunk conditioning is mutually exclusive with the other signalling code states. The second output of state machine 2001, with respect to a given line, is a set of alarm bits: Freeze (signalling being frozen), TC (Trunk Conditioning), TCNY (suppress yellow while in trunk conditioning), CFA (Carrier Fail Alarm), CGAAIS (Carrier Group Alarm: AIS cause), CGAYEL (Carrier Group Alarm: Yellow cause), CGARED (Carrier Group Alarm, incoming facility failure cause).

Figure 12A:
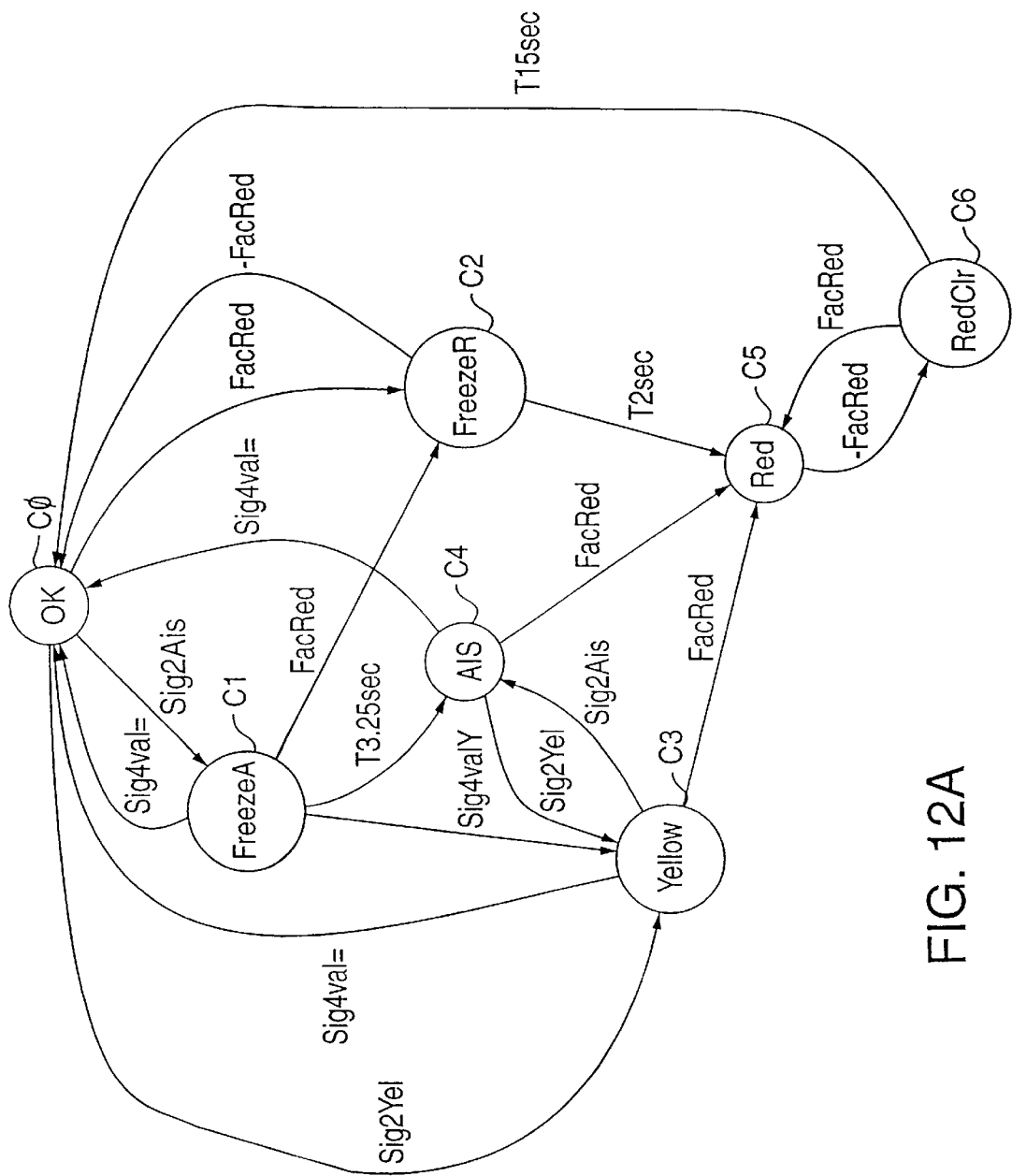
FIG. 12A shows the state machine control diagram for a signalling preprocessing layer for a state machine according to one embodiment of the present invention.

The state machine control is illustrated in the diagram of FIG. 12A. The nodes of the diagram are labelled by the state names. The arcs of the diagram are labelled by a transition condition. Table 22 below explains the meaning of the transition conditions in FIG. 12A.

TABLE 22

| | Transition Conditions |
|---|---|
| T2sec | Expiration of timer set to 2 seconds at state entry |
| T3.25sec | Expiration of timer set to 3.25 seconds at state entry |
| T15sec | Expiration of timer set to 15 seconds at state entry |
| FacRed | InFacRed signal TRUE |
| FacRed | InFacRed signal FALSE |
| Sig2Ais | DSIG and DSM1 both equal to DS0 AIS |
| Sig2Yel | DSIG and DSM1 both equal to DS0 Yellow |
| Sig4val = | (SigThawable[DSIG] TRUE) and (DSIG = DSM1 = DSM2 = DSM3) |
| Sig4valY | (SigThawableWithYellow DSIG]TRUE) and (DSIG = DSM1 = DSM2 = DSM3) |

In case two or more of the above transition conditions shall be TRUE upon evaluation, the transition for the lowest-numbered TRUE condition in Table 23 below will be the one taken.

TABLE 23

| |
|---|
| 1. FacRed/~FacRed |
| 2. Sig4valY |
| 3. Sig4val = |
| 4. Sig2Ais |
| 5. Sig2Yel |
| 6. Timer expiration |

The states of the pre-processing state machine 2001 are assigned as described below in Table 24.

TABLE 24

| | State Definitions |
|---|---|
| C0 OK | normal signalling state |
| C1 FreezeA | freeze signalling due to Ais condition |
| C2 FreezeR | freeze signalling due to facility Red condition |
| C3 Yellow | CGA-YEL(low) state |
| C4 AIS | CGA-AIS state |
| C5 Red | CGA-RED state |
| C6 RedClr | 15 second stretch while clearing CGA-RRD |

The alarm outputs of state machine 2001 are defined in Table 25 below by the function of the state. A "1" means the alarm is asserted.

TABLE 25

| | Alarm Outputs | | | | | | |
|---|---|---|---|---|---|---|---|
| State | Freeze | TC | TCNY | CFA | CGA-AIS | CGA-YEL | CGA-RED |
| C0 OK | 0 | 0 | 0 | 0 | 0 | 0 | 0 |
| C1 FreezeA | 1 | 0 | 0 | 0 | 0 | 0 | 0 |
| C2 Freezer | 1 | 0 | 0 | 0 | 0 | 0 | 0 |
| C3 Yellow | 1 | 1 | 1 | 1 | 0 | 1 | 0 |
| C4 AIS | 1 | 1 | 0 | I | 1 | 0 | 0 |
| C5 Red | 1 | 1 | 0 | 1 | 0 | 0 | 1 |
| C6 RedClr | 1 | 1 | 0 | 1 | 0 | 0 | 1 |

The all-zeroes state of Table 25 indicates that no alarms are raised for the given line and signalling is passed through from pre-processing state machine 2001 to the main state machine. Signalling pre-processing state machine 2001 is in control of the signalling sent to the main state machine. The least-recently received entry of the signalling history shift register buffer, DSM5, is mapped through programmable function table SigFreezeTo[ ] (Table 26 below), to create signalling code FSIG (frozen signalling), which is maintained within the per-line state information. The SigFreezeTo[ ] map of Table 26 determines the frozen signalling value to be used during a signal freeze interval. A specific example of rationale for this function is to map ringing signalling (code 0) to loop current feed (code 5) so as not to ring telephones during a signalling freeze. Table 26 below is illustrative for normal POTS service. The output code nomenclature follows the decimal equivalent of the binary input code commentary along the ordinate of the table:

TABLE 26

| SigFreezeTo [ ] = | |
|---|---|
| 5, | /* 0000: -R ringing */ |
| 5, | /* 0001: undefined */ |
| 5, | /* 0010: DS0 AIS */ |
| 5, | /* 0011: undefined */ |
| 4, | /* 0100: RLCF */ |
| 5, | /* 0101: LCF */ |
| 5, | /* 0110: undefined */ |
| 5, | /* 0111: DS0 Yellow */ |
| 5, | /* 1000: reserved */ |
| 5, | /* 1001: reserved */ |
| 5, | /* 1010: undefined */ |
| 5, | /* 1011: undefined */ |
| 5, | /* 1100: undefined */ |
| 5, | /* 1101: reserved */ |
| 5, | /* 1110: undefined */ |
| 5 | /* 1111: LCFO */ |

In Table 27 below, the processed signalling output of the signalling pre-processing state machine 2001 is defined by the following function of the state. DSIG denotes DSIG as defined in 1 above, FSIG denotes mapped frozen signalling as described in Table 25 above, and TC denotes the special trunk conditioning signalling code.

TABLE 27

| State | Signalling |
|---|---|
| C0 OK | DSIG |
| C1 FreezeA | PSIG |
| C2 Freezer | FSIG |
| C3 Yellow | TC |
| C4 AIS | TC |

TABLE 27-continued

| State | Signalling |
|---|---|
| C5 Red | TC |
| C6 RedClr | TC |

F. Flexible State Machine

The state machine of the UVG card allows control of the telephone line based on the signalling and line condition (e.g. off-hook or on-hook), and can be realized in the form of a software based state machine in which a microprocessor examines the various input states and timing and determines the appropriate output state. The advantage of the software based state machine is that it can be altered by changing the code which forms the state machine. The disadvantage of the software based state machine is that it requires a microprocessor and RAM to be present on the UVG card. The space and power required by the microprocessor, along with the cost, can make the microprocessor based UVG less than optimal.

An alternate mechanism for realizing a state machine is the hardware state machine, in which logic gates are hard-wired in a configuration which forms the state machine. The advantage of such a state machine is that it avoids the use of a microprocessor. The principal disadvantage of such a state machine is that once fabricated, the state machine cannot be modified. Since there are small but significant differences in the signalling formats of different telephone switches, it may be necessary to make changes to insure proper telephone line operation.

An embodiment which avoids the disadvantages of the software and hardware state machines is the flexible state machine, in which a number of variables can be programmed into registers on the UVG card, which in a preferred embodiment are in TIUA 880. These registers contain information which in combination with one or more simple logic operations, form a state machine. By changing the variables, the parameters of the state machine can be varied. The programming of these registers can be accomplished by BNUCC 800.

This method involves setting up a list of state structures which contain information specific to the state and all branch information. In the following statement, A and B represent two bit sets which specify in each branch which of the inputs need to be set and which need to be not set, respectively. This is depicted below.

Logically, the A and B compare works as follows:

X=input bits
If ((X&A)==A) & ((~X&B)==B)) then Branch to ADDR

The data structure used in this method is defined in Table 28 below using pseudocode similar to programming language C, and therefore is clear to persons skilled in the art. As illustrated in Table 28, the information includes the Timer type, which indicates the time intervals which will determine a time out condition. The output variable controls the state of the line, for example, ringing. The number of branches indicates the number of possible states which may transition to the present state. The branch information contains the specific input variable and timing parameters which need to be compared to determine if a branch to a subsequent state should be made, and if so, what the address of the construct for that subsequent state is.

TABLE 28

```
State {
    Timer type:   //This is a type of output
    Outputs;
    Number of oBranches;
    BRANCH;
    oBRANCH;    //optional branches
};
```

Table 29 below illustrates the template for a data structure.

TABLE 29

```
BRANCH{
        A;
        B;
        ADDR;
    };
```

The template of Table 29 is also described using a programming language similar to language C. In Table 29, the A and B are utilized in the comparison as described above to determine if a branch to a new address is appropriate based on the X input bits. If no matches are found in the list of BRANCHEs, then the state would stay the same.

A flag would indicate if it was the first time into the state and would set the timer to the specified value when it was. This avoids placing the timer value in each of the branches which point to a particular state.

The memory would be filled with a list of state constructs. The address in the memory would serve as the state number. The address and timer values would be saved when switching between the six lines. Only one copy of the actual state machine would be needed in this way.

This method is quick. The only constraint would be the number of branches since this is a serial process. Since there are 1800 clocks per line, it is unlikely that this method could run into any sort of time trouble, but it does use a fair amount of memory.

In order to find out how many bits a state machine would take to describe in this method, the following formula is used: S=number of states. B=number of branches. N=number of bits.

$$N=(28*S)+(30*B) \qquad \text{Equation 1}$$

Assume:
 10 bits of input
 20 bits of output
 13 bit timer—At 1 ms per tick this gives up to 8 sec.
 8 programmable values of times needed at most.
 10 bit address
 A state machine decision needs to be made every 3 ms. This leaves about 1800 clocks per line.
 Maximum of eight timer types.
 Maximum of 32 branches.
 The LS state machine which has eight states would take 644 bits.
 The full state diagram would take 940 bits.

One possible way to save memory with this method is to use only a state number instead of an address for each branch. There would need to be additional logic which would search the memory for each additional state until it located the state number desired. This method would put a limit on the number of states, which otherwise would not exist. It would save 5 bits per branch if the number of states was limited to 32. This method would thus save 105 bits on the full state machine.

To illustrate how the above method is utilized in connection with one branch in the system disclosed herein, FIG. 21 illustrates a completed data structure for the on-hook state description illustrated in Table 13 above. Also a reference to FIG. 11 is helpful, in that we can see from FIG. 11 that three possible branches from the on-hook state B8 are available, the first to ring (RNG), the second to off-hook and the third to standby. For the purposes of illustration, we will assume that branch number 1 is Ringing, then A would be selected to be 0000000000, and B would be selected, to be 1111000000. With the values for A and B indicated, the branch to Ringing would be executed. If the inputs compared with the BRANCH #1 values do not result in a branch, a further comparison of the inputs with regard to branch decision, would be evaluated. If neither of those BRANCHEs were true, the state would remain the same.

III. Universal Voice Grade Card Circuit and Loop Testing

Figure 13:
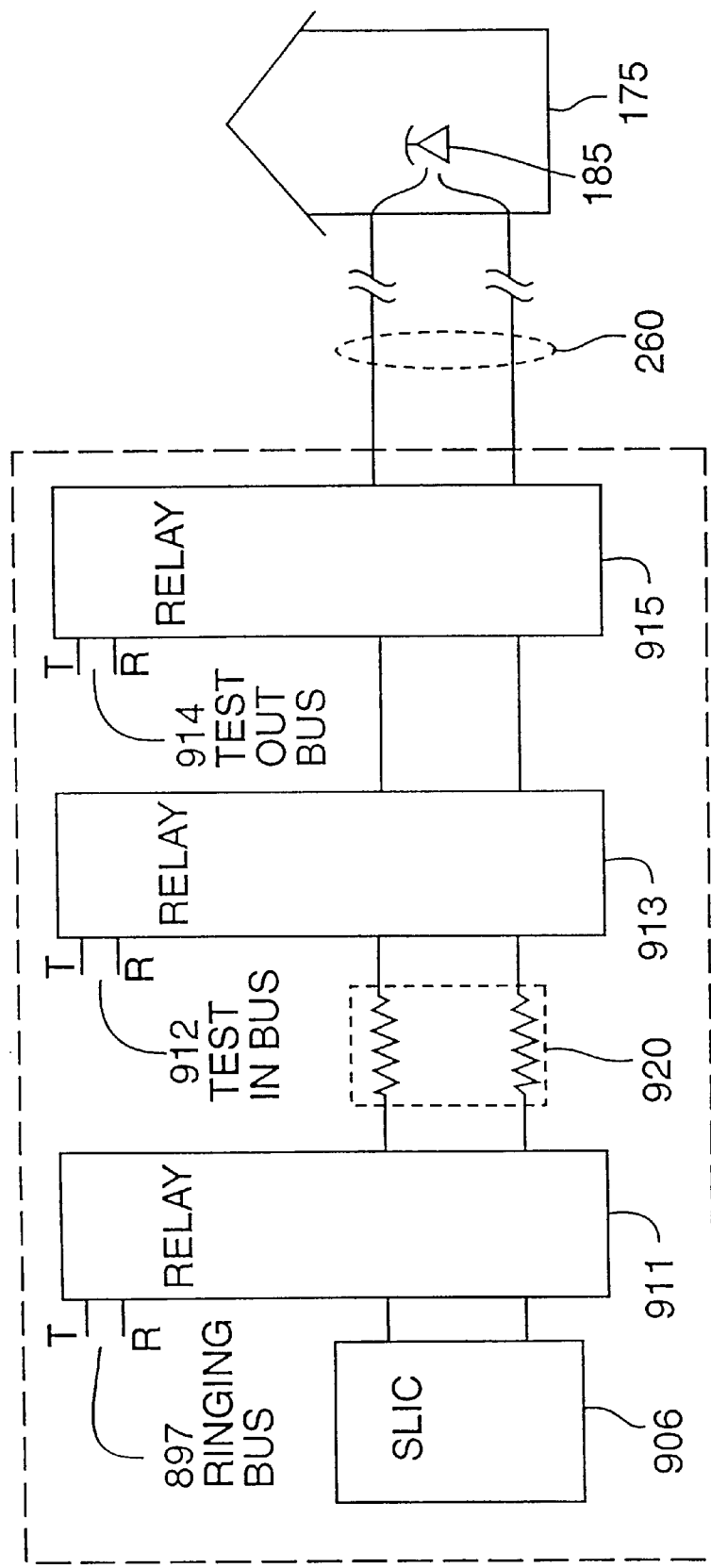
FIG. 13 shows a configuration for ringing, channel test, and drop access test relays on a prior art UVG card.

In the prior art, illustrated in FIG. 13, three relays were used to connect the ringing bus 897, testing bus 912, and test out bus 914 to the subscriber circuit. In the event that one or both of the line feed resistors 920 were open circuits due to excessive current, the channel test which examines the signal integrity from the subscriber line interface circuit 906 would fail.

Figure 14:
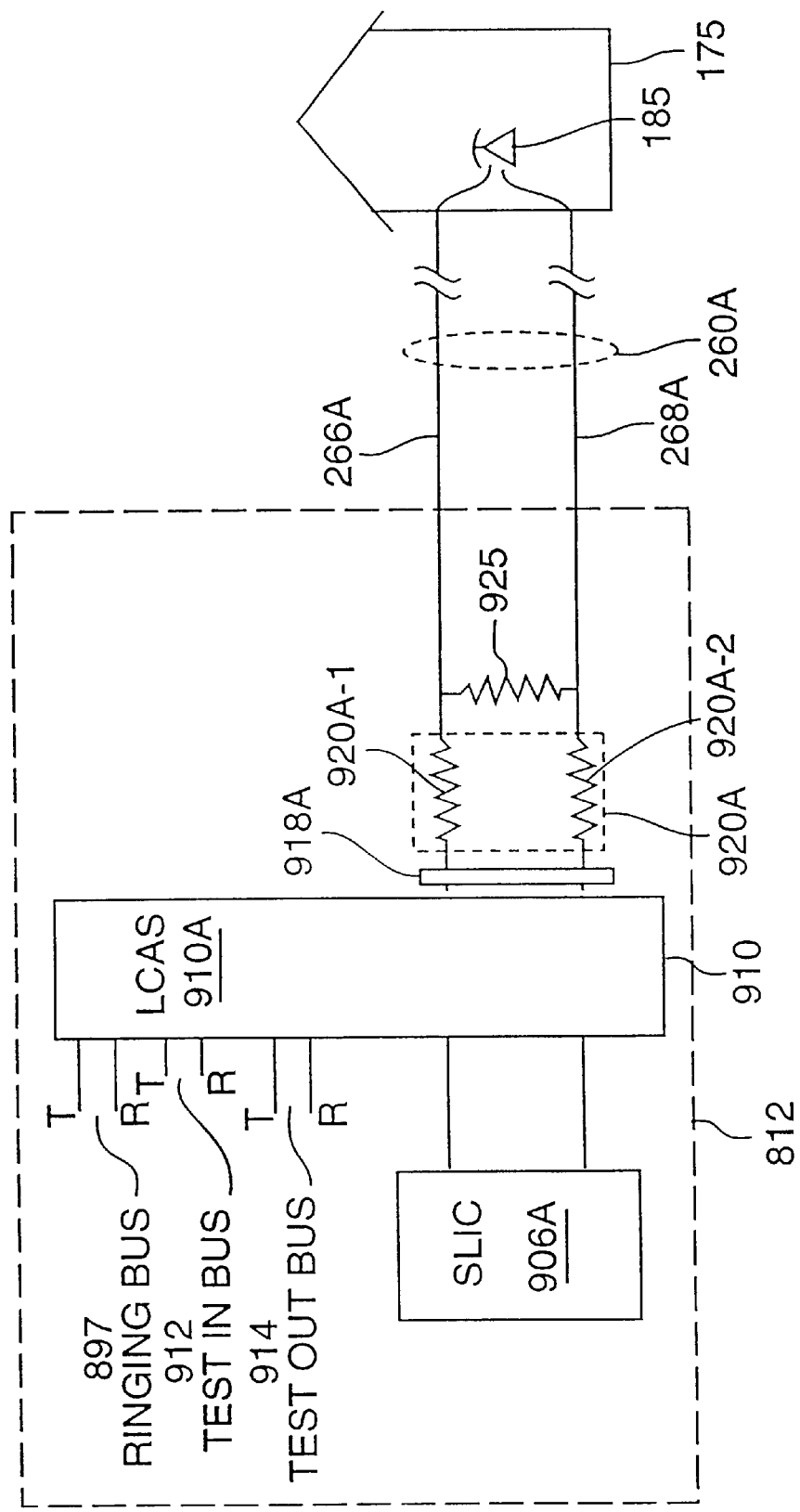
FIG. 14 shows an integrated ringing, channel test, and drop access test relay in combination with a drop test resistor in accordance with one embodiment of the present invention.

In a present embodiment, as shown in FIG. 14, the use of a solid state relay 910A which is in one location in the circuit with only line feed resistors 920A-1 and 920A-2 can result in false test results when the twisted drop pair is tested, since if one or both the line feed resistors 920A-1 or 920A-2 are open circuits the twisted pair drop test will indicate a high impedance line which will pass the test, although in reality the circuit is defective. In this case the channel test results may indicate that the subscriber line interface circuit 906A and other circuitry on the UVG card 140 is functioning properly, although the UVG card is actually not functional due to the open circuit line feed resistor 920A-1 or 920A-2.

The present embodiment solves this problem by the use of drop test resistor 925 which is placed in a shunt position between the tip lead 266A and ring lead 268A of the twisted pair drop cable 260. In the event of an open circuit line feed resistor (920A-1, 920A-2), the twisted pair drop test will indicate a very high impedance some minimum resistance which is due to the drop test resistor 925. An open circuit indicates that one or both of the line feed resistors are open. A suitable design choice for the drop test resistor is 400 KΩ.

We claim:

1. In a fiber-to-the-curb telecommunications system having a voice grade card for providing voice telecommunications services, a method for controlling telephone line states, said method comprising the steps of:

a) storing output state information comprising line states;

b) storing a variable which represents the number of branches;

c) storing branch condition information comprising signalling data, line status and timer information which indicate branching conditions;

d) storing branch address information;

e) comparing said branch condition information to determine if said branching conditions are met; and f) retrieving subsequent output state information branch address information when said branching conditions are met.

2. The method of claim 1, further comprising the step of:

g) repeating step e) until the time at which one of said branch conditions are met.

* * * * *